(12) United States Patent
Paukshto et al.

(10) Patent No.: US 7,271,863 B2
(45) Date of Patent: Sep. 18, 2007

(54) COLOR LIQUID CRYSTAL DISPLAY WITH INTERNAL REAR POLARIZER

(75) Inventors: Michael V. Paukshto, Foster City, CA (US); Louis D. Silverstein, Scottsdale, AZ (US)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 10/638,083

(22) Filed: Aug. 7, 2003

(65) Prior Publication Data

US 2004/0085496 A1    May 6, 2004

Related U.S. Application Data

(60) Provisional application No. 60/419,321, filed on Oct. 16, 2002.

(51) Int. Cl.
G02F 1/1335 (2006.01)
(52) U.S. Cl. ........................................................ 349/96
(58) Field of Classification Search ................ 349/96, 349/106, 113
See application file for complete search history.

(56) References Cited

U.S. PATENT DOCUMENTS

| | | | |
|---|---|---|---|
| 4,241,984 A * | 12/1980 | Leibowitz | ................... 349/162 |
| 5,659,408 A | 8/1997 | Wenyon | |
| 5,753,937 A | 5/1998 | Shimomaki et al. | |
| 5,926,245 A | 7/1999 | Kwok et al. | |
| 5,949,506 A | 9/1999 | Jones et al. | |
| 6,069,675 A | 5/2000 | Mizobata et al. | |
| 6,108,064 A | 8/2000 | Minoura et al. | |
| 6,124,971 A | 9/2000 | Ouderkirk et al. | |
| 6,341,001 B1 | 1/2002 | Kwok | |
| 6,417,899 B1 | 7/2002 | Jones et al. | |
| 6,559,915 B1 * | 5/2003 | Amimori et al. | ........... 349/112 |
| 6,574,044 B1 * | 6/2003 | Sahouani et al. | ........... 359/498 |

FOREIGN PATENT DOCUMENTS

| | | |
|---|---|---|
| EP | 0 576 303 A1 | 12/1993 |
| EP | 0 985 953 A2 | 3/2000 |
| JP | 60-059323 A * | 4/1985 |
| JP | 7 333598 A | 10/1989 |
| JP | 04-212931 A * | 8/1992 |

OTHER PUBLICATIONS

Cheng, Hongfei et al., "Dynamic parameter space method to represent the operation modes of liquid crystal displays", *J. App. Phys.*, vol. 86, No. 11, Dec. 1999, pp. 5935-5937.

(Continued)

*Primary Examiner*—David Nelms
*Assistant Examiner*—Timothy L. Rude
(74) *Attorney, Agent, or Firm*—Westerman, Hattori, Daniels & Adrian, LLP.

(57) ABSTRACT

A color liquid crystal display is provided comprising a front panel including at least one polarizer, a rear panel including at least one polarizer, liquid crystal placed between the front and rear panels, a reflective layer on the rear panel, and a matrix of color filters. The polarizer on the rear panel is an internal polarizer and placed before the matrix of color filters or between said matrix and the reflective layer. The combined thickness of all layers positioned between the matrix of color filters and the rear polarizer does not exceed 10 microns.

29 Claims, 30 Drawing Sheets

OTHER PUBLICATIONS

Kwok, H. S., "Parameter space representation of liquid crystal display operating modes", *J. Appl. Phys.*, vol. 80, No. 7, Oct. 1, 1996, pp. 3687-3693.

Kwok, H. S. et al., "Generalized parameter space diagrams for all liquid crystal displays", *ASID 1999*, pp. 165-169.

Uchida, Tatsuo, "Reflective LCDs", *SID Seminar Lecture Notes*, Hynes Convention Center, Boston, May 20-24, 2002, vol. 11, p. F-2/3-F-2/50.

* cited by examiner 20
 21
 22

COLOR LIQUID CRYSTAL DISPLAY WITH INTERNAL REAR POLARIZER

RELATED APPLICATION

This application claims priority to the U.S. Provisional Patent Application No. 60/419,321, filed Oct. 16, 2002, the disclosure of which is hereby incorporated by reference in its entirety.

FIELD OF THE INVENTION

This invention pertains to the field of liquid crystal displays and indicators, in particular to liquid crystal displays using polarizers.

BACKGROUND OF THE INVENTION

Liquid crystal displays (LCDs) have become an important attribute of portable devices because of their low energy consumption and small size compared to other contemporary devices. The development of the liquid crystal indicatory technology has enable LCDs to create color graphical images of high quality while maintaining their small size and weight, low energy consumption and relatively low price. These combined characteristics significantly broaden the applications of LCDs as displays and indicators of portable computers, computational systems and devices, as displays and indicators of measurement equipment and sensors, as displays and indicators of portable household devices such as mobile phones, onboard computers, notebooks, watches etc., as projectors and screens for large scale imaging in movie theaters, at shows, in public places and events, and as shutters in optical feedthroughs and sources of radiation.

The design of liquid crystal displays, principle of their operation and their main components have been described in literature. See, for example, Wu et al., "Reflective Liquid Crystal Displays" 2001, John Willey and Sons Ltd., and Lueder, "Liquid Crystal Displays: Addressing Schemes and Electro-Optical Effects", 2001, John Willey and Sons Ltd.

In a mirror type or reflective type display, light enters the display and is reflected by a mirror and exits back through one side of the display. The main advantage of this type of display is the minimal requirements of artificial lighting in order to form an image. Generally, a mirror type display utilizes light from surrounding sources and does not require an illumination system.

This significantly decreases consumption of energy during operation. In order to operate the display in poor lighting or complete darkness conditions, the display system often includes an intrinsic source of illumination and optical components for front illumination of the display surface. But even in this case, the energy consumption of the illumination system is significantly lower than in the case of a transmitting display.

A combination of a reflecting and a transmitting type of displays is also common. This combined system is often designated a transflective type of display. The main distinction of the transflective type of display from the reflective type of display is that the mirror in the transflective type of display is semi-transparent and allows using the display in the transmitting regime if such regime is allowed by the design of the functional layers in the display.

Liquid crystal displays can be conveniently described in terms of rear and front sides. The front side is the one facing the viewer, while the rear side is the one opposite to the viewer. The set of layers in the display in front of the liquid crystal is referred to as the "front panel", while the set of layers in the display behind the liquid crystal is referred to as the "rear panel". The functional layers placed in the different panels are identified as the "rear" or "front" layers, for example, the rear and front substrates, and the rear and front electrodes, etc. The different sides of a single layer can also be identified in the display.

FIG. 1 schematically shows a reflective display comprising a set of flat functional layers performing various functions. In particular, the display comprises a front polarizer 101, a retardation plate 102, a front transparent substrate 103, a matrix of color filters 104, a front transparent electrode 105, a liquid crystal 106, a diffusive or specular or holographic reflector 107, and a rear transparent substrate 108. Numeral 109 represents the liquid crystal cell. In order to create an image on the display, light from the surrounding sources or illumination is modulated within the display's layered structure. In addition to the mirror and the source of light, particularly the functional layers of liquid crystal layer and at least one layer of polarizer form the image.

In a reflective display, as shown in FIG. 1, the liquid crystal is always situated behind the front polarizer, while the mirror is behind the liquid crystal. The principle of operation of the reflective liquid crystal display is based on controlling the state of polarization of light, polarized by the front polarizer, and changed by the nonlinear optical properties of the liquid crystal via application of voltage through the electrodes. The particular type of change of polarization of light at the exit from the liquid crystal depends on the operation regime of the liquid crystal in the display: twisted-nematic, super-twisted-nematic, or mixed mode. In case of twisted-nematic displays, the rotation of the polarization plane results primarily from the twist effect in the liquid crystal. In the case of super-twisted-nematic displays and displays with mixed-mode operation regimes, the change of the initial polarization state results from some combination of rotational twist effects and polarization phase retardation due to birefringence of the liquid crystal layer.

In reality, most modern liquid crystal displays rely on the mixed mode of operation, since the twisted- and super-twisted-nematic regimes require relatively large thickness of the liquid crystal layer, which may decrease image brightness. In transmitting displays, this decrease of brightness may be compensated by increasing the brightness of illumination source. However, in reflective displays such an approach does not work.

By changing the voltage across the liquid crystal, the state of polarization of light exiting the liquid crystal can be gradually changed. After the second interaction with the polarizer, the light intensity changes according to the value of applied voltage. The particular details of interaction of light with the liquid crystal in a reflective type display are determined by the selected regime of operation of the liquid crystal and its parameters. They also determine many performance characteristics of the display such as contrast ratio and brightness, viewing angle, transitional characteristic of the display, and achromatic color delivery, etc.

When the functional order of the main optical layers in a display is determined, the operation regime of the liquid crystal is determined by the mutual orientation of axes of each of the polarizers and the director of molecules of liquid crystal closest to the polarizer layer, the optical path difference between the ordinary and extraordinary rays in the liquid crystal, and the selected angle of twist of directors of molecules in the liquid crystal upon transition from one side of the crystal to the other. The presence of retarders and their characteristics also play a role. In almost all cases, the operation regime uses a certain combination of these parameters.

The common values of the angle of twist of liquid crystal are 45°, 90°, 240°, 270°. See Wu et al., "Reflective Liquid Crystal Displays", 2001, John Willey and Sons Ltd. The angle of any polarizer is often chosen such that the transmission axis is parallel or perpendicular to the directors of molecules in the closest layer of the liquid crystal. When two polarizer layers are used, their transmission axes are often oriented to be perpendicular to one another.

Due to the fact that in the reflective display light goes through all the layers of the display twice, such displays may only have one polarizer. This polarizer is installed in front of the liquid crystal layer, thus the ray of light is polarized when it passes through polarizer for the first time. After the ray of light passes twice through the liquid crystal, before and after the reflection from the mirror, it interacts with the front polarizer again.

Reflective type displays with a single polarizer often have a poor contrast ratio. When the liquid crystal is operating in the mixed regime, light becomes elliptically polarized after it passes through the liquid crystal, which lowers the effectiveness of the second interaction with the polarizer.

Many publications address this problem. See for example, Kwok et al., "Generalized Parameter Space Diagrams For All Liquid Crystal Displays", p.165-169, ASID 1999; Kwok, "Parameter Space Representation Of Liquid Crystal Display Operating Modes", J. Appl. Phys., Vol. 80, No. 7, p.3687-93, October 1996; Cheng et al., "Dynamic Parameter Space Method To Represent The Operation Modes Of Liquid Crystal Displays", Journal of Applied Physics, 86, p.5935, 1999. In order to increase the contrast ratio and enhance other characteristics of the display, the prior art references suggest varying value of all parameters which determine the operation regime of the liquid crystal, including optical path differences in the liquid crystal, angles of turn of the polarizer relative to the directors of molecules in the peripheral layer of the liquid crystal, as well as the angle of turn of the directors of molecules in the liquid crystal. EP0576303 and U.S. Pat. No. 6,108,064 suggest the use of retarders as functional layers for the same purpose.

As a result of calculations and experiments in this direction, acceptable values of contrast ratio with relatively large viewing angles have been derived for color displays as well as for black and white displays, see for example, EP985953, U.S. Pat. Nos. 5,926,245 and 6,341,001. However, using untraditional parameters of operation regime of the liquid crystal often leads to complications in their design, which often makes the mentioned results poorly reproducible in mass production of displays.

This difficulty can be illustrated in a particular example related to one of the most often varied parameter: the angle between the optical axis of the polarizer and the directors of molecules of the liquid crystal in the layer closest to the polarizer. The direction of the transmission axis of the polarizer based on dichroic organic molecules is fixed at the time of polarizer alignment. In most cases, this fabrication step comprises stretching a ribbon of polarizer material through a special device. As a result, the direction of the axis of the polarizer comes out parallel to the edges of the ribbon. If the mentioned angle is not either 90° or 0°, then when the ribbon is cut to size before being installed into the display, the amount of wasted material is increased.

U.S. Pat. No. 6,417,899 describes a known color liquid crystal display comprising an internal polarizer placed between an alignment layer and a layer of color light filters. The drawback of such a display is that it uses the alignment layer to define the direction of the transmission axis of the polarizer, which complicates fabrication of the display, and excludes using operation regimes when the axis of the polarizer is not parallel to the axis of the alignment layer. Further, there is a possibility of worsening the image quality in case of poor alignment of the light filter and liquid crystal layers.

Uchida discloses a reflective type color liquid crystal display without the internal polarizer wherein the distance between the layer of color filters and mirror is reduced at the expense of eliminating the rear polarizer in order to achieve the proper color delivery when the display is observed at an angle. See Uchida, Reflective LCDs, SID Seminar Lecture Notes, Hynes Convention Center, Boston, 20-24 May 2002, Vol. II, p F2/3. One of the drawbacks of such a design is the decreased contrast ratio, which is unavoidable for reflection type displays without rear polarizer. In addition, the matrix of color filters in such a display is placed in front of the liquid crystal, which decreases the viewing angle due to the increased viewing parallax resulting from the increase of the distance between the matrix and the mirror.

SUMMARY OF THE INVENTION

The present invention provides a high-contrast color liquid crystal display having an internal polarizer, which is capable of creating full-color images at large viewing angles. The color liquid crystal display comprises a front panel including at least one polarizer, a rear panel including at least one polarizer, liquid crystal placed between the front and rear panels, a reflective layer on the rear panel, and a matrix of color filters. The polarizer on the rear panel is internal. The combined thickness of all layers positioned between the matrix of color filters and the rear polarizer does not exceed 10 microns.

BRIEF DESCRIPTION OF THE DRAWINGS

The present invention will be more clearly understood from the following description when read in conjunction with the following accompanying drawings in which.

DETAIL DESCRIPTION OF THE INVENTION

The present invention provides a reflective type color liquid crystal display comprising a matrix of color filters and at least one rear polarizer that significantly increases viewing angles without distortion in color delivery. In general, the liquid crystal display comprises a front panel including at least one polarizer, a rear panel including at least one polarizer, liquid crystal placed between the front and rear panels, a reflective layer on the rear panel, and a matrix of color filters. The polarizer on the rear panel is an internal polarizer and placed between the matrix of color filters and the reflective layer. The disclosed invention can be used in different types of liquid crystal displays which have polarizers in their designs, for example liquid crystal displays which utilize a vertically-aligned mode, an in-plane switching mode, passive-matrix or active-matrix addressing.

Figure 1:
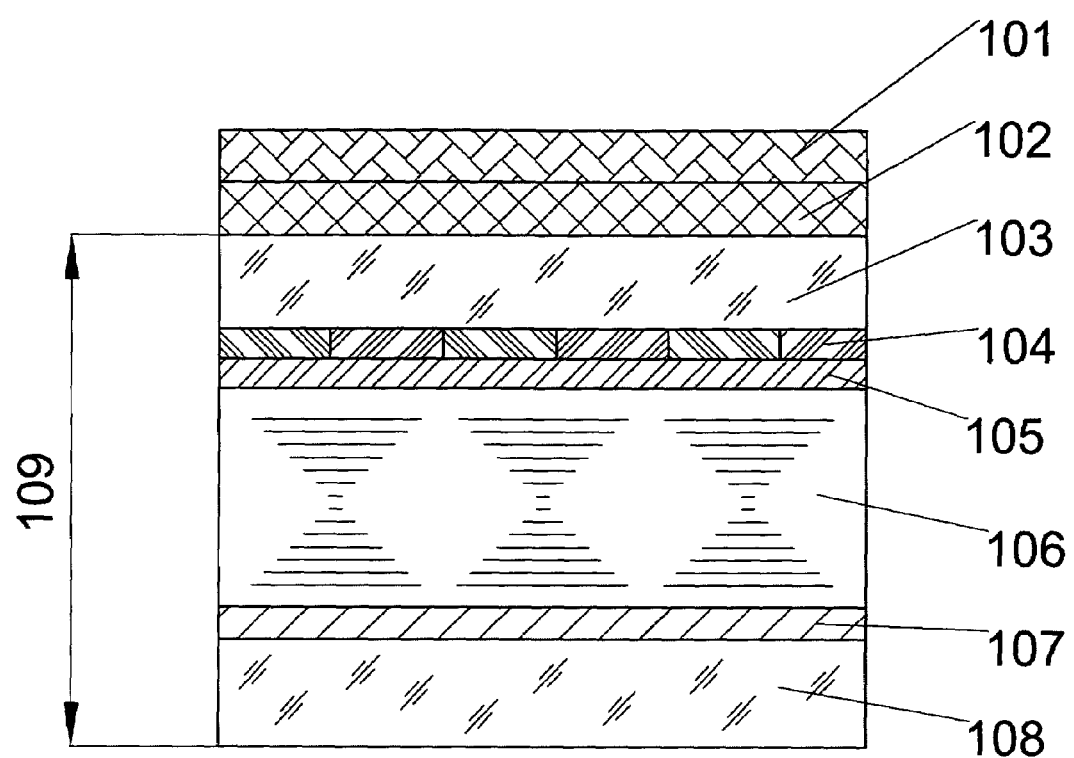
FIG. 1 is a schematic showing a color reflective liquid crystal display with a single polarizer.
Figure 2:
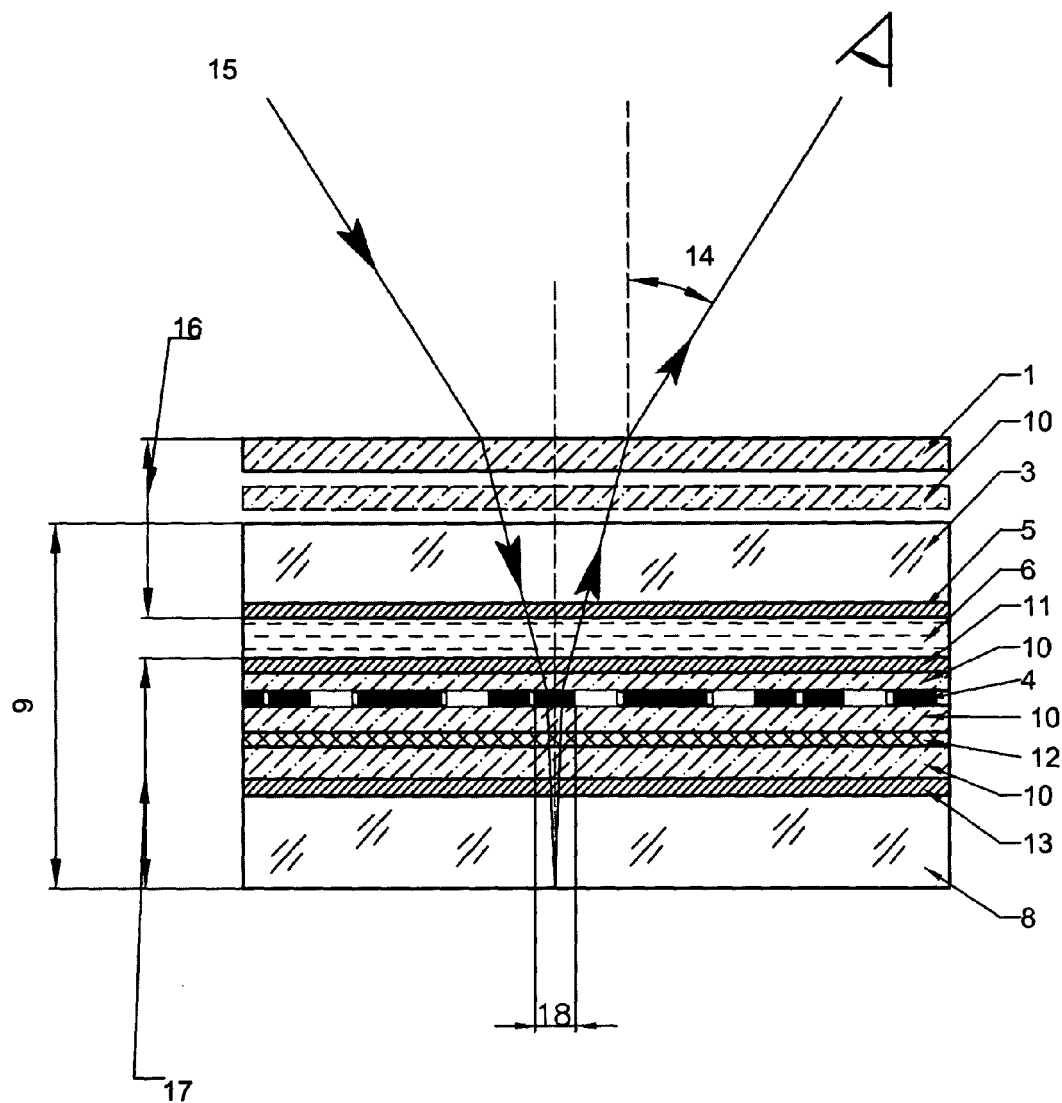
FIG. 2 is a schematic showing a color reflective liquid crystal display with two polarizers.
Figure 3:
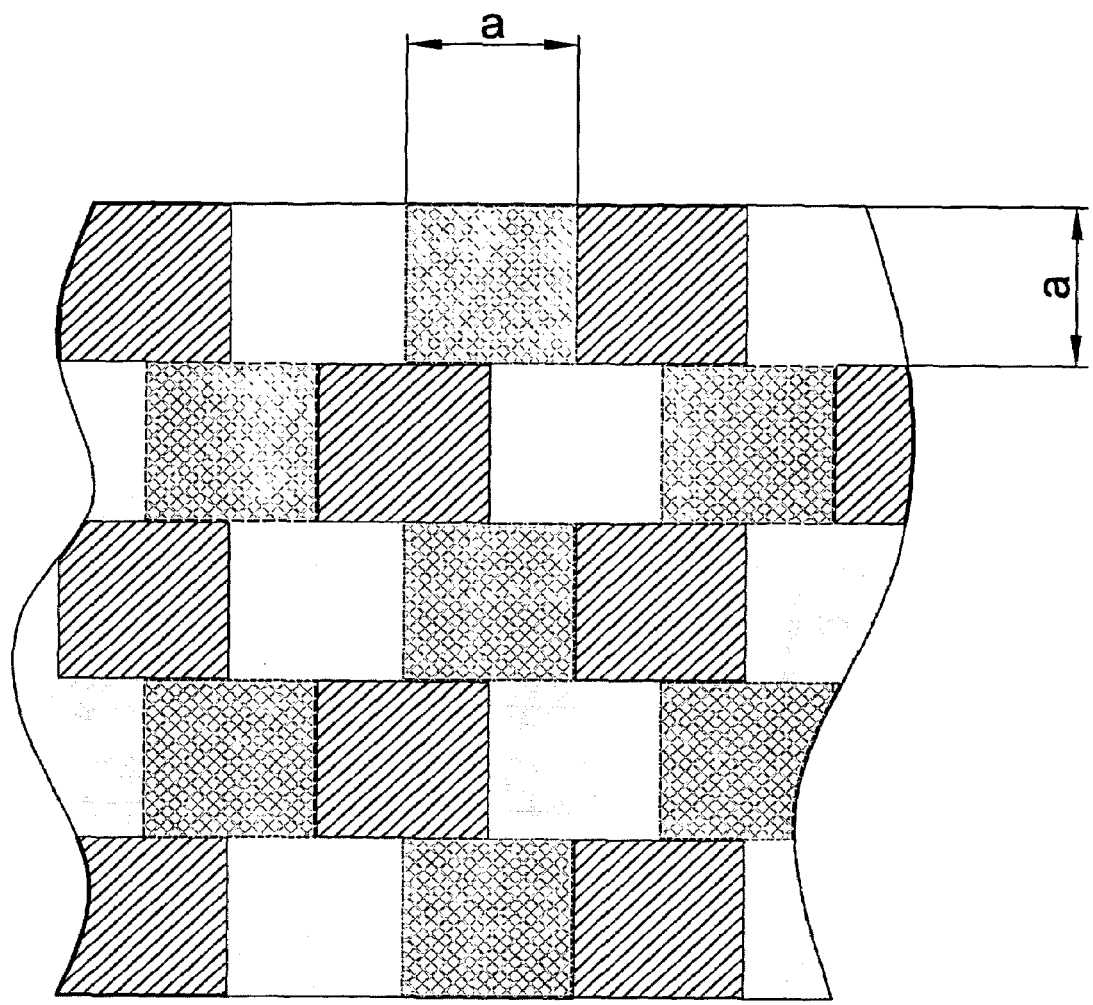
FIG. 3 is a schematic showing one variant of a matrix of color filters.
Figure 3:
Figure 3:
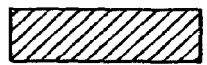
Figure 3:
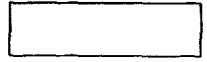

FIG. 2 schematically shows a reflective type color crystal display comprising a front polarizer 1, functional layers 10, a front transparent substrate 3, a front transparent electrode 5, liquid crystal 6, a rear transparent electrode 11, a matrix of color filters 4, a rear polarizer 12, a mirror 13, and a rear transparent substrate 8. The viewing angle is represented by the angle 14 and light rays from surrounding sources by 15. Front panel 16 represents a combination of layers in front of the liquid crystal 6. Rear panel 17 represents a combination of layers behind the liquid crystal 6. The numeral 18 represents the pixel size of the matrix of color filters 4. FIG. 3 shows a matrix of color filters showings the blue, red and green filters 20, 21 and 22 of the matrix 4. Under the functional layers here and below, one or several layers selected from the list comprising polarizer layer, alignment layer, electrode layer, substrate layer, reflective layer, protective layer, retardation layer, isolation layer, planarization layer, diffusive layer, light-scattering layer, color filter layer, and any other layer can be employed to realize or to improve the functional properties of the liquid crystal display.

To increase the contrast ratio with the traditional parameters of the operation regime of the liquid crystal, it is preferable to use a second polarizer between the liquid crystal and the mirror. This can significantly increases the contrast ratio, compared to the display with just one front polarizer. At the same time, it is generally simpler to fabricate a reflective display with two polarizers because at least one retardation layer can typically be eliminated and a display with two polarizers can typically be made to operate with a more stable operating mode by relying more on the twist structure of the liquid crystal layer and less on the birefringence and phase retardation of the liquid crystal layer. This in turn makes the operation of the display less sensitive to temperature variations, liquid crystal cell gap variations and mechanical stresses. All of these factors result in improved manufacturing yield and lower fabrication costs.

The matrix (layer) of color filters (microfilters), which is used to create color images, is another important element of the color liquid crystal display. The structure and function of the human visual system allows for the generation of any realizable color via the mixture of three suitable primary colors. Red, green and blue are typically used as the primary colors in additive color reproduction devices such as electronic monitors and indicators. In this case mixture colors are obtained by adjustment of the relative intensities of the primary colors.

The matrix of color filters serves to highlight the smallest element of the image, the pixel, with the three main colors. This goal is achieved via transmission of light through one of the three color filters situated in a row, one of which has maximum transmission in the region of red color ($\approx$630 nm), the second in the region of blue color ($\approx$550 nm), and third in the region of green color ($\approx$460 nm). The spectral passband of each color filter is typically quite wide ($\cong$50-100 nm) and centered about the peak transmission wavelength; however, color filter parameters are usually carefully optimized for a particular display and application to achieve a balance between color saturation and light throughput. By controlling the intensity of light passing through each light filter, the color of a pixel comprising the three microfilters can be arbitrarily changed. The assumption here is that the light from the illumination source or the surrounding natural light sources is broadband and relatively achromatic, thereby providing sufficient spectral radiance in the passbands of each of the primary color filters.

Since pixels in the display are usually grouped in a regular matrix, triples of the color light filters are also ordered in a regular matrix, which forms the matrix (layer) of color light filters, as shown in FIG. 3. The particular arrangement shown in this figure is a delta pattern with offset pixels. There are many other patterns of color filter mosaics which are in common use such as vertical stripe, horizontal stripe, diagonal stripe and color quad mosaics.

The particular method of grouping separate color light filters into sets, corresponding to the main colors used in the display, as well as the method of situating the mentioned sets inside of the layer relative to each other, depends on the method of ordering pixels in the liquid crystal, as well as on the arbitrary choice of the manufacturer. The first item, which determines the design of the layer of color light filters, is the requirement of precise alignment of each color light filter with the corresponding pixel in the liquid crystal, since the pixel of the liquid crystal controls light intensity. Due to the requirement of precise alignment of the layer of color light filters and the layer of liquid crystal light intensity control elements, these layers should be placed as close to each other as possible. In many cases only the transparent electrode and alignment layers separate these layers.

Because of the finite thickness of functional layers in a liquid crystal display, a common problem is the limitation of the viewing angle at which the image is still legible and not unduly distorted. In the general case, the concept of the limited or the maximum useable viewing angle is somewhat unclear, since it depends on, first, the particular type of observed distortion, second, on the value of the arbitrary quantitative characteristic representing the amount of distortion, above which the image is considered "poor", etc. Because of this, the most common concept is the viewing angle. The viewing angle of a display is the angle between the direction from the observer's eye to the display and the normal to the display plane, at which the image can be observed on the display.

There are various types of distortions which appear when observing the image on a liquid crystal display at an angle. It can be a decrease of the contrast ratio and brightness, appearance of a "negative" image of reversed contrast, and doubling of the image, etc. The most typical methods of counteracting angular distortions are to decrease the thickness of the display and/or to add compensatory optical layers such as retardation films.

Figure 4:
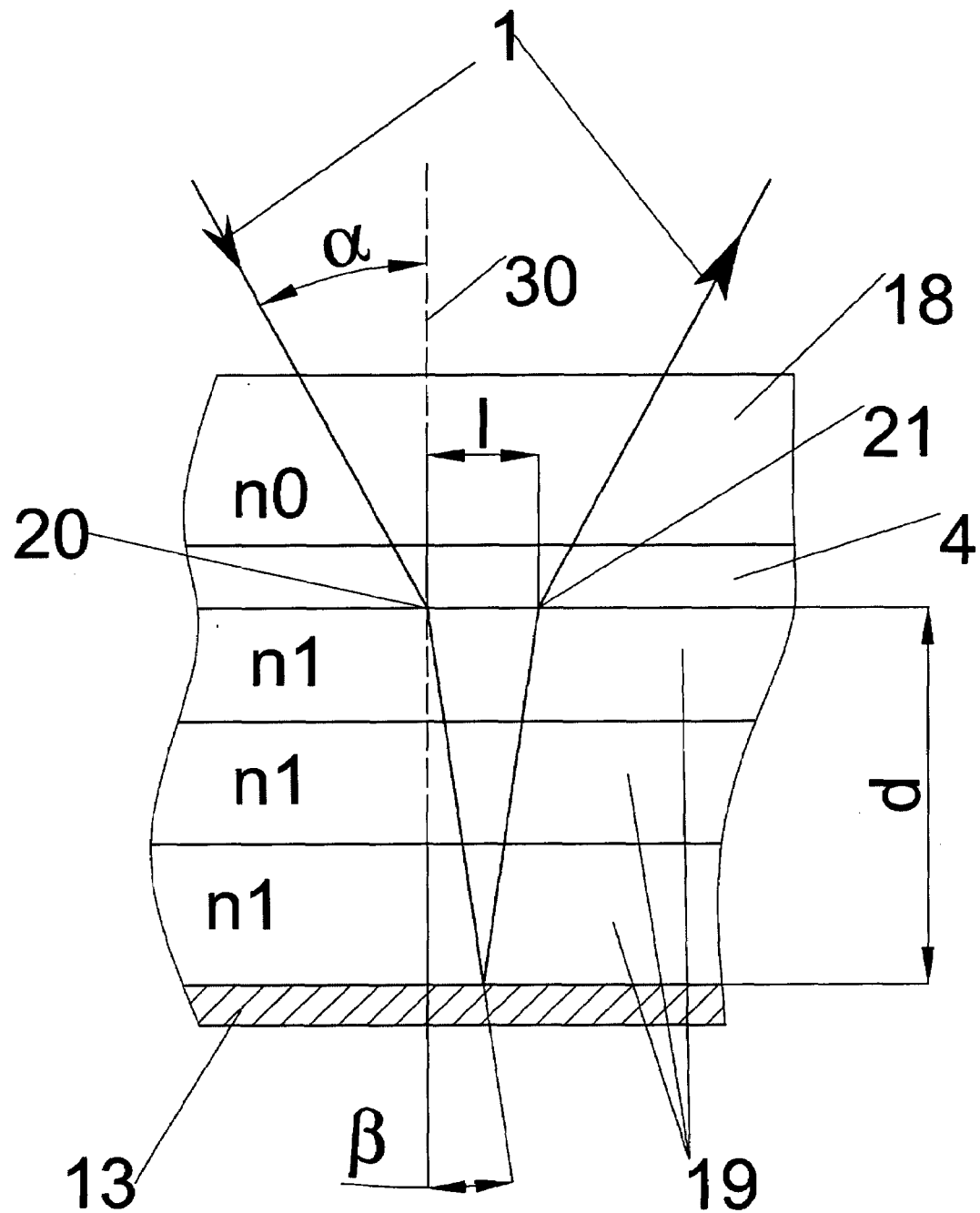
FIG. 4 is a schematic showing propagation of an incident light ray through a structure having two layers with different refraction indexes and a mirror.

Distortions of color occur in a color reflective type display when images are observed at an angle. The cause of these distortions can be illustrated using a simple model as shown in FIG. 4. The matrix of color filters 4 is placed between the layers 19 and 18 of the liquid crystal display, and the reflective layer 13 is placed on the rear side of the liquid crystal display. The plurality of layers 18 is on the front side of the color filter matrix 4 and the plurality of layers 19 is on the rear side of the color filter matrix 4. The combined thickness of the layers between the matrix of color filters 4 and the reflective layer 13 is designated as d. The light ray 1 enters the layers between the matrix of color filters 4 and the mirror 13 at a point 20, and an angle between the normal 30 to the plane of matrix of color filters 4 and the light ray 1 is α. For the sake of simplicity it is supposed that all layers 18 on the front side of the matrix of color filters 4 have equal refraction indices n0, and all layers 19 between the matrix of color filters 4 and the mirror 13 have equal refraction indices n1. The matrix of color filters 4 has refractive index n0. Since the refraction indices n0 and n1 differ, the light ray is refracted at an angle β as it enters the layers placed between the matrix of color filters 4 and the reflector 13. Then the light ray 1 travels to the mirror 13, is reflected from the mirror 13, travels back to the matrix of color filters 4, and leaves the layers 19 between the matrix of color filters 4 and the mirror 13 at a point 21. The distance between the points 20 and 21 is designated as l. The application of the Snell's law gives the simple formula for the distance l:

$$l = \frac{2d}{\sqrt{\left(\frac{n_1}{n_0 \sin(\alpha)}\right)^2 - 1}} \quad (1)$$

In the case when the ray of light enters the layers under the matrix of color filters and leaves after reflection from the mirror through the same light filter, the ray will correctly assume the color of that filter. In an opposite case when the ray of light leaves through the neighboring or other light filter, the resulting color of the light ray becomes the result of sequential passes through two different color filters, and distortion of the color of the display is then generally unavoidable. Therefore the larger distance l between entering and leaving points leads to the color distortion.

According to the formula (1):

The value of l increases with α, i.e. the larger value of incident angle gives the larger distance between the entering and leaving points of light ray, the large values of l correspond to the large values of α.

The value of l decreases with d, and the desired high viewing angle can be achieved with the decrease of the thickness of layers between the color matrix and the reflective layer.

Therefore, the simple model shown in FIG. 4 demonstrates the increase of the viewing angle without color distortion as the thickness of the layers between the color matrix and the reflective layer decreases.

Figure 5:
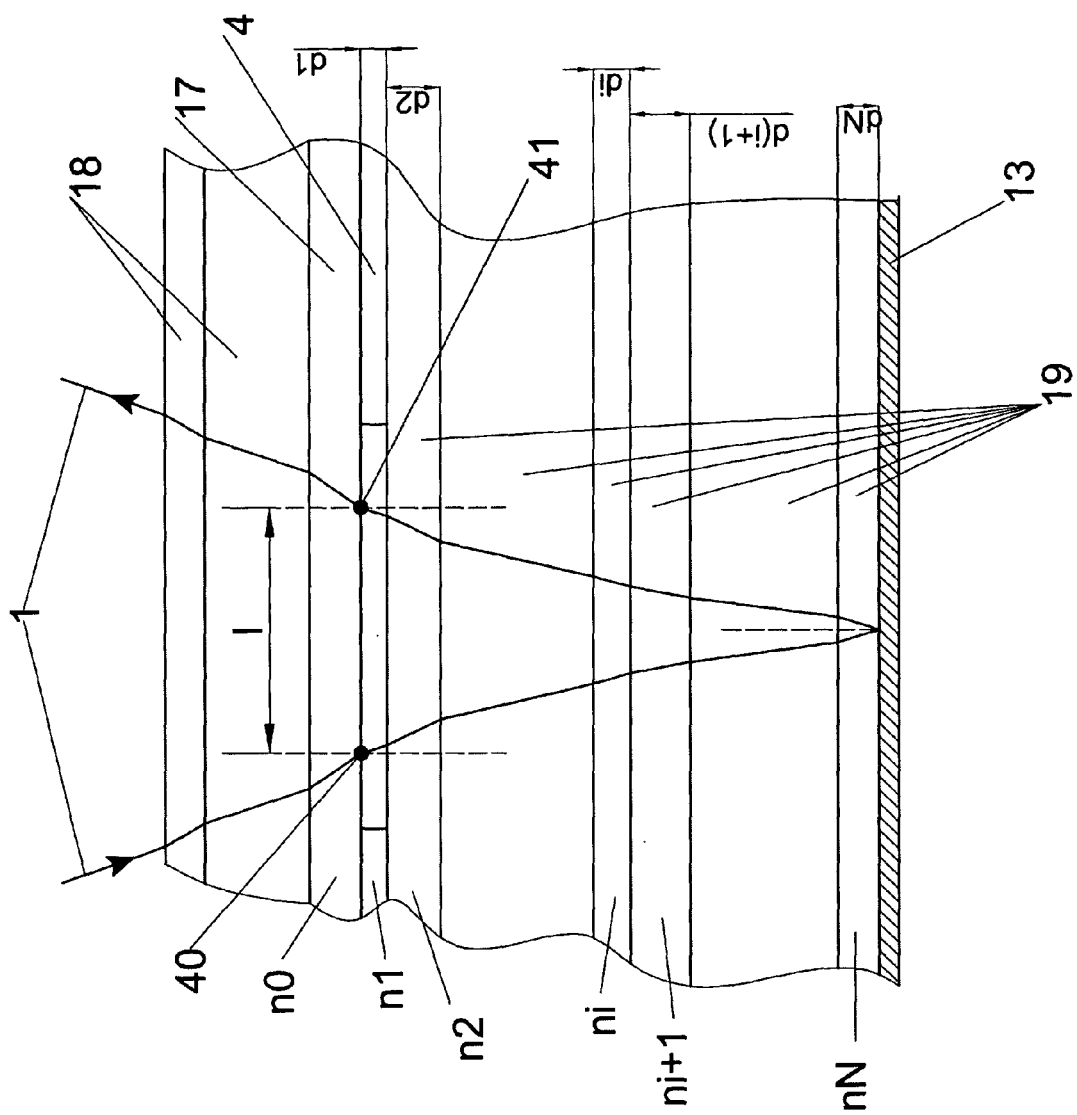
FIG. 5 is a schematic showing propagation of a light ray through a multilayer structure of a liquid crystal display.

The generalized model is shown in FIG. 5. The layer 17 having refraction index n0 is placed on the front side of the matrix of color filters 4. The layers 19 are placed between the matrix of color filters 4 and the mirror 13. The layers 18 are placed on the front side of the layer 17. A light ray 1 is incident on the surface of the matrix of color filters 4 at an angle α0 to the normal. After entering the matrix 4 at the point 40, the light ray 1 passes through a sequence of N layers, each of which has refraction index $n_i$ and thickness $d_i$. Here i is the number of the layer in order from the matrix 4 to the mirror 13. All the layers are flat and placed parallel to each other. After reflection from mirror 13, the light ray 1 passes again through a sequence of layers 19, and leaves the matrix of color filters 4 at the point 41. The distance between the points 40 and 41 is designated as l analogously to the example shown in FIG. 4. The formula for the distance l is:

$$l = 2 \sum_{i=1}^{N} \frac{d_i}{\sqrt{\left(\frac{n_i}{n_0 \sin \alpha_0}\right)^2 - 1}} \quad (2)$$

At the same time, even a more complex model cannot describe all practical cases. This is due to the fact that calculations depend heavily on the geometrical configuration of pixels, i.e., on their shape and mutual placement in the matrix. Besides that, the packing of pixels on the matrix plane may not be contiguous, i.e., the color filter matrix may contain gaps between individual color filter elements, which may be either transparent or masked with a black matrix material. This exacerbates the already mentioned dependence of the maximum viewing angle for an undistorted color image on the polar angle of observation.

The layers placed in front of the layer of color filters also affect the distortion of color delivery. As we have mentioned, the viewing angle is measured from the normal to the front surface of the display. Obviously, the angle of incidence of light onto the underlying color filter matrix may be determined using the value of the external incident angle along with the sequence of overlying layers, their thicknesses and refraction indices.

In Equation (2), the details of reflection of the light ray from the mirror are not taken into account. All calculations are performed assuming that the mirror in the display has an ideally smooth surface without roughness, which excludes scattering. There is good technical justification for using a specular reflectance model since in the opposite case of an ideally scattering (Lambert) reflective surface, it is impossible to create any useable image on the display due to light depolarization by the scattering surface. Moreover, the use of an ideal specular reflector would result in a severely restricted viewing volume which is limited to the plane of incidence and a single angle of reflectance and would also restrict the viewing angle for the displayed image to coincide with that of unwanted front-surface reflections.

Introducing a diffusing medium, which scatters light to a relatively small arbitrary angle from the original direction, can create an expanded display viewing volume and a decoupling of effective viewing angles from the masking effects of unwanted front-surface reflections. For example, a transmitting or reflective layer with microscopic non-homogeneities may be installed, arbitrarily distributed in space or in the plane. In practice such a scattering surface provides the display with the characteristic of gained scattering in which the light from the display is distributed about the specular angle within some finite angular cone.

Because of the random nature of the light scattering process, it is convenient to use probability of reflection at a defined scattering angle for its quantitative characterization. Scattering angle refers to the angle of inclination of light from the original direction after scattering at the non-homogeneity. Dependence of light intensity on the scattering angle in this approach assumes the meaning of probability of scattering to a defined angle. The concept of probability is also helpful in describing transmission by the system. Obviously, it will be determined by scattering on the diffusing layer, since the rest of layers in the display either do not scatter light or scatter it to a negligible angle.

The solutions to the problem of creating an expanded effective viewing volume without undue light depolarization in liquid crystal displays currently used in practice include: using a mirror with rough surface, using diffusing film placed behind the front polarizer and in front of the front substrate, using liquid crystal material with reverse diffused scattering of light (in this case, the mirror is replaced by an absorber), and using liquid crystal materials with direct diffused light scattering.

In the case of an ideally smooth surface, angular dependence of the probability of scattering has the form of the delta function with the maximum at the angle of specular reflection, the absolute value of which is equal to the incidence angle, and direction of which is opposite to the direction in which this angle is measured. In the case of a pure Lambertian surface, this dependence has the form defined by a cosine function. Solutions mentioned above are relevant for practical purposes, since they provide effective viewing cone enhancement as well as suppression of any interference effects in display layers during formation of an image.

When the surface of the mirror has an arbitrary profile with a root-mean-square deviation from the ideal smoothness equal to k, the angular dependence of the probability of scattering has the form of Gaussian curve with the maximum at the angle of specular reflection. The width of the Gaussian curve, angle of scattering $\omega$, is a function of the parameter k. Thus, by selecting the value of roughness of the mirror surface, the maximum reflection from the display within an expanded viewing cone can be achieved.

From the practical standpoint, it is advantageous that the angular dependence of the reflection coefficient has a "rectangular pulse" shape with the defined maximum scattering angle $\omega$. This allows obtaining the maximum reflection coefficient from the display in the defined range of viewing angles.

The form of the angular dependence of the reflection coefficient from the mirror is determined by the roughness of the mirror, in other words, by its micro-relief.

Referring again to the problem of determining the distance between the point of entry and exit of light ray on the color light filter, in the case of diffuse mirror the incident and the reflected rays should be considered separately. The reflected ray may propagate in some arbitrary direction, determined by the angle of incidence and the angle of scattering on the mirror. In this case, the shape of the micro-relief of the mirror determines the probability of scattering to a certain angle. In the case with the randomly rough surface the value of this parameter will be determined by the half-width of the Gaussian curve, and in the case of rectangular pulse shaped angular dependence, by the maximum angle of scattering, etc. In any case, the character of this angular dependence may be derived from the micro-relief of the mirror surface.

Taking the above into account, in order to provide proper color delivery of the display, it is important to ensure that the light ray entering the aperture of any given light filter leaves through the aperture of the same light filter after getting reflected from the mirror with high probability.

The particular form of relationship between the viewing angle and parameters of the display can be determined by known methods in applied optics. See for example, Wu et al., "Reflective Liquid Crystal Displays" 2001, John Willey and Sons Ltd. The particular method of dependence, precise formula, approximated formula, tabulated curve, and computer code, can be changed depending on the selected method of solution.

To provide proper color delivery in the display when observed at an angle, it is necessary that there is a high probability that any light ray incident on an aperture of any given color filter goes through the aperture of the same color filter after being reflected from the mirror. In order to provide proper color rendering and high brightness of the display, this probability is preferably a high value, for example 90%. In one embodiment, the probability of any light ray incident on the surface of the display at a given viewing angle and propagating through a particular color light filter going through the same color filter after being reflected from the reflective layer is no less than 90%.

This high probability may be achieved by varying one of the following parameters of the display: the order of placement of layers in the display, i.e., the sequence of their alternation in the display along the direction from the front panel to the rear panel; the thickness of each layer in the display; the refractive index of each layer in the display; the dimensions, shape and placement of color filters in the matrix of color filters; and the micro-relief of the mirror's surface, or the angular dependence of the reflection coefficient of the mirror defined by this micro-relief.

There are limitations however, which do not allow arbitrarily changing any parameter of the display's design in order to achieve the maximum viewing angle. The characteristic size of the light filter a is defined by the resolution of the display. A standard color liquid crystal display is generally required to provide resolution of no less than 72 pixels per inch, which taking into account the complexity of color filters leads to the limitation of the maximum color filter size of about 0.1 mm. Despite the fact that some applications do not require high resolution, which may increase the mentioned value, the general tendency of development of color flat-panel displays and indicators is to lower that value and to push it toward the level of resolution of printing devices (300-1200 pixels per inch). Consequently, dimensions of the color filter are predetermined for a display with a defined application resolution and tend to decrease. In addition, the size of a color filter is rigidly connected to the size of the pixel in the liquid crystal. Increasing the size of a color filter will inevitably lead to the change of the entire fabrication technology of the display, including a reduction of display resolution.

Further, the refractive index of layers cannot significantly affect the angular characteristics. Firstly, the refraction index for an arbitrary material is within the range of 1.5-2. Such a narrow range for this parameter will only allow changing of the viewing angle within a quite narrow frame. Secondly, the value of the refractive index is completely determined by the material of the layers and often predetermined by the function of the layer. For example, the layer of polarizer is always fabricated from nonlinear optical materials, the refractive index of which is about 1.5.

In addition, the sequence of placement of layers is often defined by their functional purpose and cannot be changed arbitrarily. Besides, this parameter and the refractive index have only limited effect. These same arguments are true for the scattering properties of the mirror.

The thickness of layers between the matrix of color filters and mirror is a significantly attractive parameter. In most cases, the thickness of the functional layers between the matrix and mirror is not rigidly related to their functional purpose. With the development of fabrication technology of materials and displays, the thickness of most layers in the display may be significantly reduced. Moreover, there is a certain freedom in the choice of the layer subject to change, which can enhance operational characteristics of the display without significant changes to the technological sequence in general.

A simple and manufacturable method to solve the problems of color distortion in reflective color displays is to decrease the thickness of layers between the matrix of color filters and the mirror.

The first consequence of this requirement is the placement of a rear polarizer between the liquid crystal and the transparent rear substrate. The transparent substrate has a significant thickness compared to other layers in the display (up to ≅1 mm), and in order to decrease the thickness of layers between the matrix and the mirror, the substrate should be placed behind the mirror. Due to the fact that the rear polarizer is between the mirror and the liquid crystal, such placement of a rear polarizer is internal, i.e., the rear polarizer is placed between the transparent substrates of the display.

A combined thickness of the matrix of color filters and layers between the matrix of color filters and the reflective layer is selected such that light rays incident on a surface of the display from within a wide angular cone of illumination and propagating through a color filter travel through the same color filter after being reflected from the reflective layer, thereby providing a reflective color display with a wide angular viewing volume free of angle-dependent color distortion.

Further enhancement of operational characteristics of the display may be achieved by using a thinner polarizer. For example, the prior art iodine polarizers used in most displays is about 200 μm thick. At the same time, the polarizer fabricated by Optiva Inc. (USA) may be less than 1 μm thick. This polarizer is fabricated from optically anisotropic dichroic thin crystal films. This film can be used in the capacity of the material to produce polarizers due to its characteristic properties, such as small thickness, low temperature sensitivity, high anisotropy of refractive indexes, anisotropic absorption coefficients, angular characteristics, high polarizing properties when light propagates at an angle, large value of dichroic ratio, and simplicity of fabrication.

These properties are due to certain peculiarities of the material and the method of fabrication of the thin crystal films, in particular the molecular-crystalline structure of the thin crystal films, which is formed via crystallization of liquid crystal phase of at least one organic material, which forms lyotropic or thermotropic liquid crystal phase, via application of the liquid crystal onto a substrate using an alignment influence and subsequent drying. In the capacity of the organic material of the anisotropic film, one uses at least one organic material, formula of which contains at least one ionogenic group, which provides its solubility in polar solvents, and/or at least one non-ionogenic group, which provides its solubility in non-polar solvents, and/or at least one anti-ion, all of which, in the process of obtaining the material either remain in the structure of molecules or are removed.

Optically anisotropic dichroic thin crystal films are formed by the multitude of supramolecular complexes of one or several organic materials. See Jean Marie Lehn, "Supramolecular Chemistry-Concepts and Perspectives", VCH Verlagsgesellschaft GmbH, 1995. Moreover, the supramolecular complexes are aligned in a certain way in order to provide polarization of the propagating light.

The initial choice of material to create the optically anisotropic dichroic thin crystal film is determined by the presence of the system of π-conjugate bonds in the aromatic conjugate cycles and the presence in molecular groups such as amine, phenol, ketone, etc., which lay in the plane of a molecule and represent a part of the aromatic system of bonds. The molecules themselves or their fragments have flat built. For example, this may be such organic materials as indanthrone (Vat Blue 4), or dibenzoimidasole 1,4,5,8-perelentetracorbixilic acid (Vat Red 14), or dibenzoimidasol No,4,9,10-perelentetracarboxilic acid, or quinacridone (Pigment Violet 19) and others, derivatives of which or their mixtures form the stable lyotropic liquid crystal phase. After that, this choice may be narrowed according to the requirements for the transmission spectrum of the film in the range of visible light. Using dyes in the capacity of the initial material allows using polarizers in the capacity of the correcting color or neutral filters, as well as in the capacity of ultraviolet or infrared filters. The technological goal, and utilized materials, etc determine the choice between these possibilities.

Dissolving such organic compounds in a suitable solvent produces a colloid system (lyotropic liquid crystal or LLC), wherein molecules are aggregated into the supramolecular complexes, which represent kinetic units of the system (WO 01/63346). The liquid crystal phase represents a preordered state of the system, which determines the initial anisotropy of the material. In the process of aligning supramolecules and subsequent removal of the solvent, a hard thin crystal film is formed, which features optical anisotropy, in particular being dichroic.

The process of aligning the polarizer leads to formation of a micro-relief structure on its surface, which has a predominant direction. This allows using polarizers in the capacity of surface alignment layers in a liquid crystal display.

Within the obtained optically anisotropic dichroic thin crystal film, the planes of molecules are parallel to each other and the molecules form a three-dimensional crystal in at least a part of the thin crystal film. When the fabrication method is optimized, it is possible to obtain monocrystalline, optically anisotropic dichroic thin crystal films. The optical axis in such a thin crystal film will be perpendicular to the planes of molecules. Such crystalline films will possess a high degree of anisotropy and a high refractive index and/or absorption coefficient for at least one direction, i.e., it will feature polarizing properties.

Providing the necessary anisotropy of absorption coefficients and refractive indices, as well as alignment of the main axes, i.e., optical properties of the anisotropic dichroic thin crystal film in the multilayer structure, is possible via using a certain angular distribution of molecules in the polarizing film on the surface of the substrate.

It is also possible to mix colloid systems (in this case, combined supramolecular complexes will form in solution) in order to obtain thin crystal films with intermediate optical characteristics. The absorption and refraction of the optically anisotropic dichroic thin crystal films obtained from a mixture of colloid systems may assume various values within the range defined by the initial components. Mixing various colloid systems to create combined supramolecules is possible if one parameter (interplanar distance) is common to each organic compound in the mixture (3.4±0.3 A).

The possibility to influence optical properties of the film in the process of fabrication by all the mentioned methods allows "tuning" them according to the particular goal. Thus, this allows changing the absorption spectrum of a polarizer, which is useful in order to provide a proper color delivery and achromatic quality of the display. By using their birefringence, films may be used in the capacity of optical phase shifting plates with the defined value of the phase shift at a given wavelength. Changing optical anisotropy of films can enhance angular characteristics of devices with thin crystal film polarizers.

The thickness of the optically anisotropic dichroic thin crystal film is controlled through the content of the solid phase in the solution. The concentration of the solution is the manufacturing parameter during fabrication of such optically anisotropic thin crystal films, which is easily controlled during fabrication.

The surfaces on which the thin crystal films are applied may be subjected to additional processing in order to provide homogeneity of wettability of the surface to provide hydrophilic quality of the surface. The additional processing may be mechanical processing, baking, and mechanochemical processing. Such processing may also decrease the thickness of the film and increase the degree of orderliness. Alternatively, to increase the orderliness of the film, the surface of the substrate may feature aligning anisotropic structures via mechanical processing of the surface.

Optical dichroic quality of the film allows using polarizers, which are formed from it, in the capacity of phase shifting plates to increase the contrast ratio or angular characteristics of the display.

FIGS. 6A-6D and 24A-24D schematically show four designs of the color liquid crystal display in accordance with the present invention.

The designs shown in FIGS. 6A-6D, which depict variations for a transflective color liquid crystal display, are for illustrative purpose and not intended to limit the scope of the present invention in any way. In general, the display includes front and rear panels, liquid crystal, a pair of electrodes, a matrix of color filters, and at least one optically anisotropic thin crystalline film (layer) placed in the rear panel. Other functional layers such as protective layer, planarizing layer, phase shifting layer, layers for light correction and achromatic quality of the display, alignment etc., can also be incorporated into the display. To provide better alignment, the matrix of color filters and liquid crystal are preferably placed as close as possible to each other, leaving a gap between them only for the layers functionally necessary. Placement of the internal rear thin crystalline film between the matrix of color filters and liquid crystal is not required.

Referring to FIGS. 6A-6D, the liquid crystal display comprises a front polarizer 601, a retardation layer 602 such as a 570 nm retardation film, a front substrate 603 such as a substrate made of glass, a color filter matrix 614, a transparent electrode 604 such as an ITO electrode, an optically anisotropic thin crystalline film (TCF) 606 such as a TCF internal rear polarizer, a protective layer 607 such as an acryl layer, a reflective layer 608 such as semi-transparent reflective layer, a rear substrate 603 such as a substrate made of glass, and a supplementary rear polarizer 610 for augmenting transmissive mode performance. The front and supplementary rear polarizers can be either a TCF polarizer or a standard polarizer available in the prior art. An isolation layer 615 such as silicon dioxide ($SiO_2$) can also be included to isolate the electrode 604 from other functional layers. Light path 611 and backlight unit 617 represent a transmissive mode of the display. Light path 612 and the ambient light source 616 represent a reflective mode of the display. The liquid crystal is represented by the numeral 613.

Figure 6A:
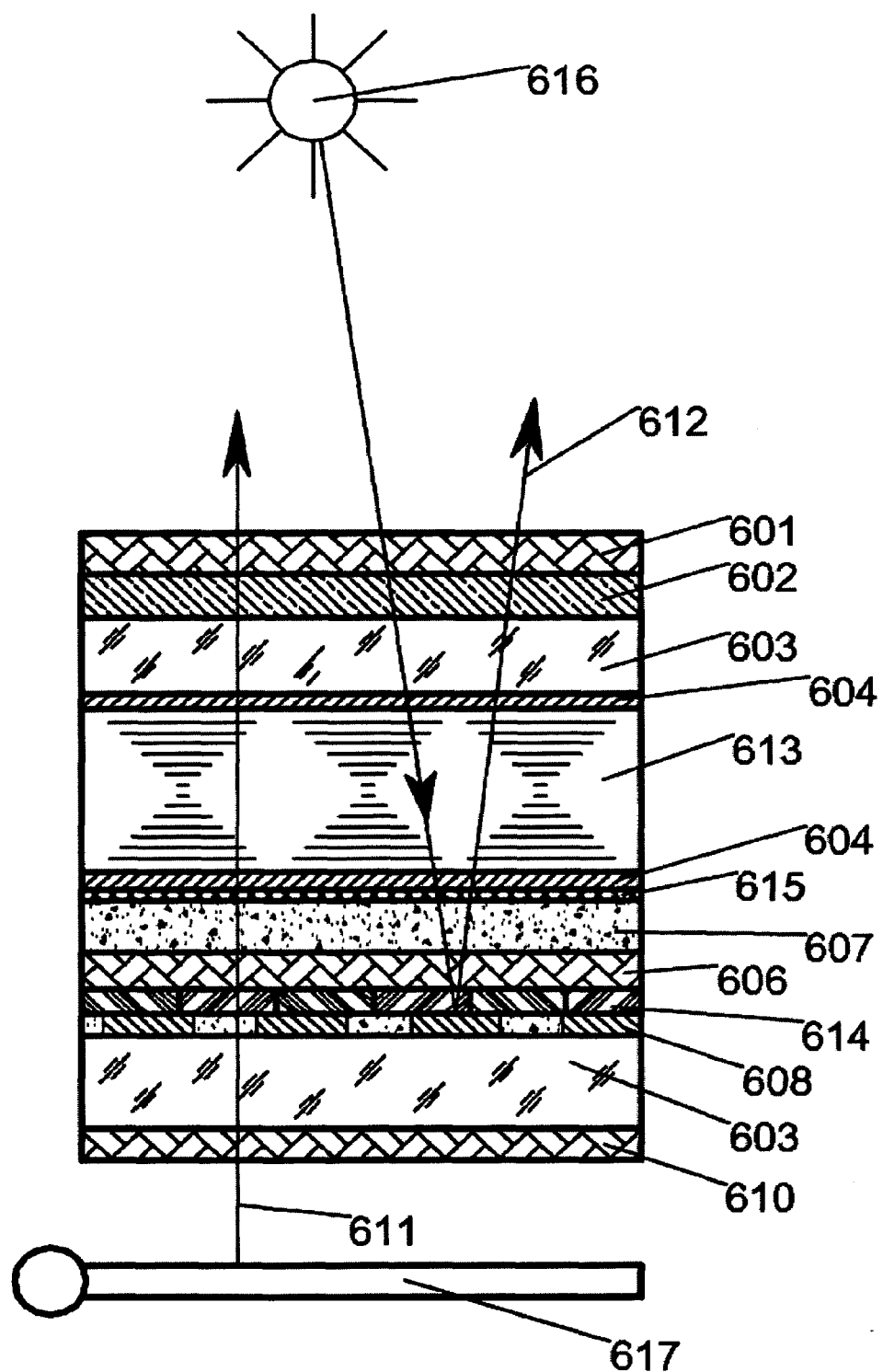
FIGS. 6A-6D are schematics showing some designs of the liquid crystal display having an internal rear polarizer in accordance with the present invention.

In one embodiment shown in FIG. 6A, the matrix of color filters is positioned between the internal rear polarizer 606 and the reflective layer 608 in the rear panel. In this design, the internal rear TCF polarizer 606 can provide a "polarization clean-up effect" caused by light scattering and depolarization by the color filters 614. In particular, light from the backlight unit 617 goes through the external supplementary rear polarizer 610 and is polarized. In case that the backlight is polarized then the rear polarizer 610 is not necessary. The polarized light may be partially depolarized when it passes through the color filter matrix 614. A second polarizer such as the internal rear TCF polarizer 606 then re-polarizes the partially depolarized light back. Accordingly, if there is some light leakage on the initial polarizing stage due to some imperfect polarization, the internal TCF polarizer 606 may improve the contrast of the display by repolarizing the light prior to polarization analysis by the final polarizer in the light path. Note that this last function is applicable to both the reflective and transmissive operating modes of the display.

Figure 6B:
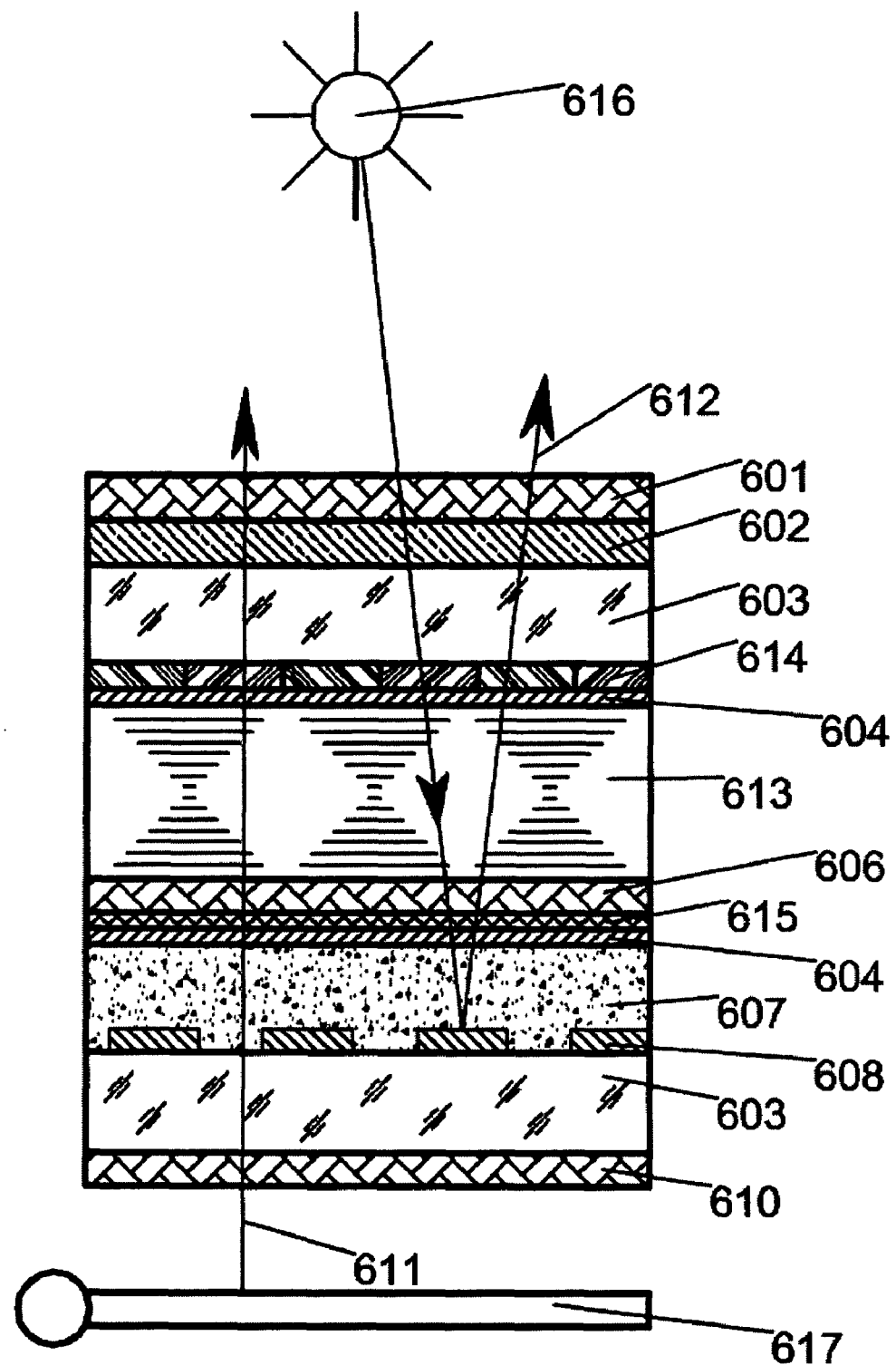

In another embodiment shown in FIG. 6B, the matrix of color filters 614 is placed in the front panel and positioned close to the liquid crystal 613 next to the front electrode layer 604. This design can improve the alignment of the liquid crystal display.

Figure 6C:
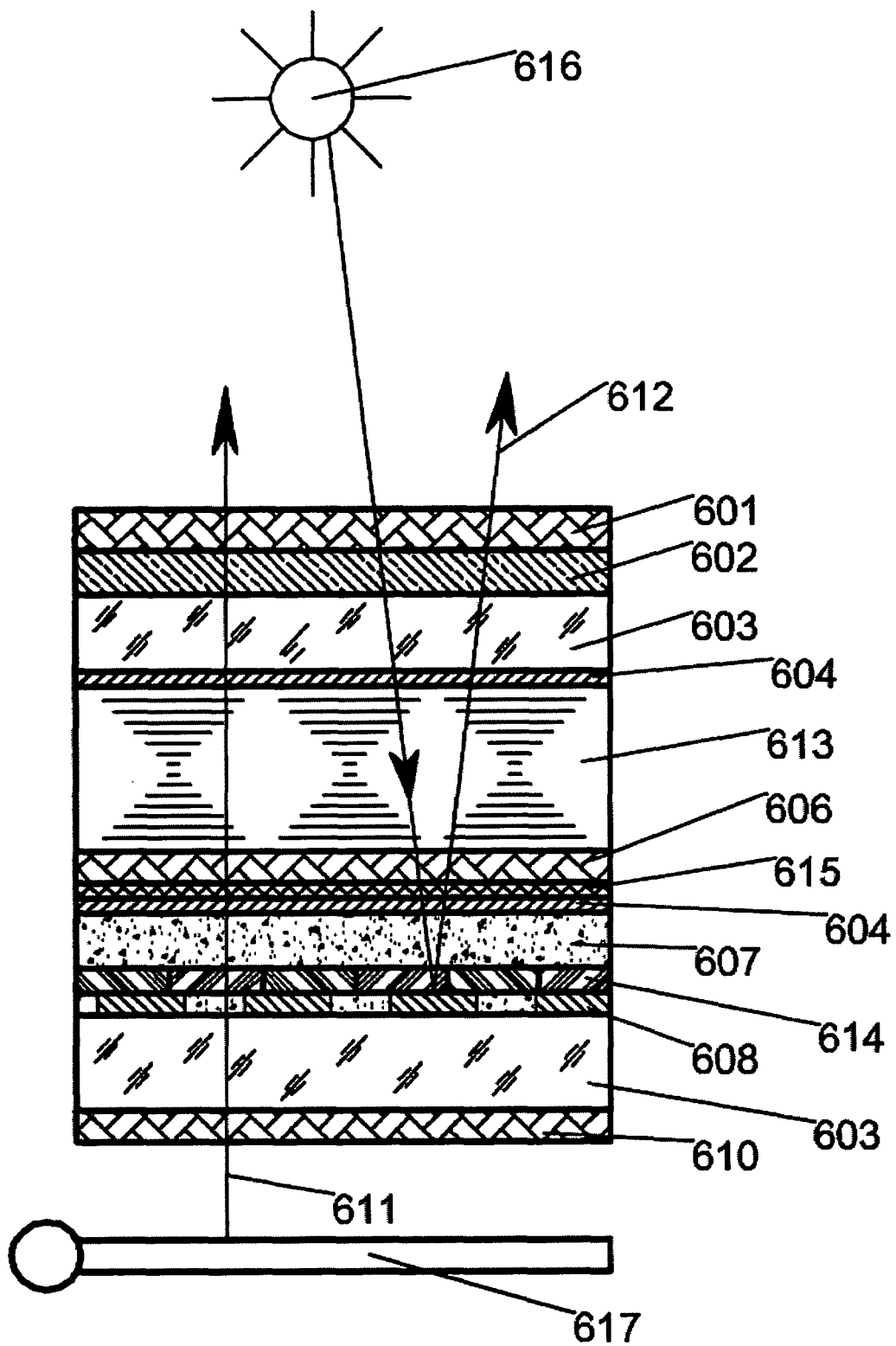

In a further embodiment shown in FIG. 6C, the matrix of color filters 614 is placed atop the reflective layer 608 in the rear panel, and the internal rear polarizer 606 is positioned close to the liquid crystal. In this design, the internal rear polarizer 606 also functions as an alignment layer.

Figure 6D:
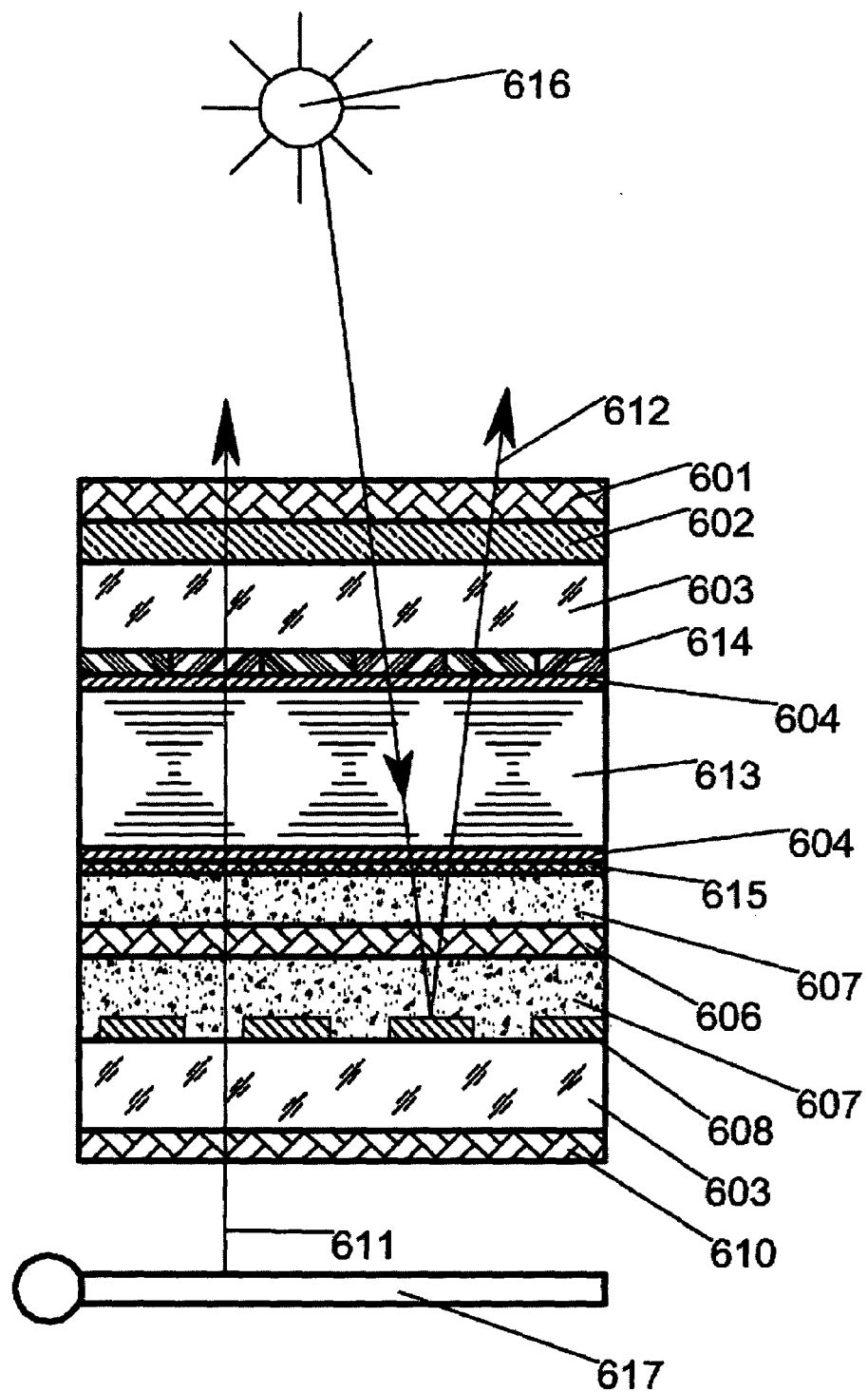

In another embodiment shown in FIG. 6D, the matrix of color filters 614 is placed in the front panel. The internal rear polarizer 606 is placed between the rear electrode 604 and the reflective layer 608. This design can reduce or eliminate voltage driving in operation of the display.

The optically anisotropic thin crystalline film (layer) of the invention can function as a polarizer as shown in FIGS. 6A–6D and 24A–24D. It can also function as a compensation layer, color correction layer, or serve any combination of polarization, compensation and color correction functions.

Referring to FIGS. 24A–24D, the liquid crystal display comprises a polarizer 2401, a front substrate 2403 such as a substrate made of glass, a color filter matrix 2406, an optically anisotropic thin crystalline film (TCF) 2405 polarizer, a reflective layer 2408 such as semi-transparent reflective layer, a rear substrate 2412 such as a substrate made of glass. The polarizer 2401 can be either a TCF polarizer or a standard polarizer available in the prior art. Light path 2410 and backlight unit 2407 represent a transmissive mode of the display. Light path 2409 and the ambient light source 2411 represent a reflective mode of the display. The liquid crystal is represented by 2404. The front and rear panels are designated with the numerals 2440 and 2430, respectively. The distance 2450 is the distance between the color filter matrix 2406 and the optically anisotropic thin crystalline film (TCF) 2405 polarizer. The numeral 2402 represents possible but not compulsory layers such as protective, or planarization, or alignment or any other layers.

Figure 24A:
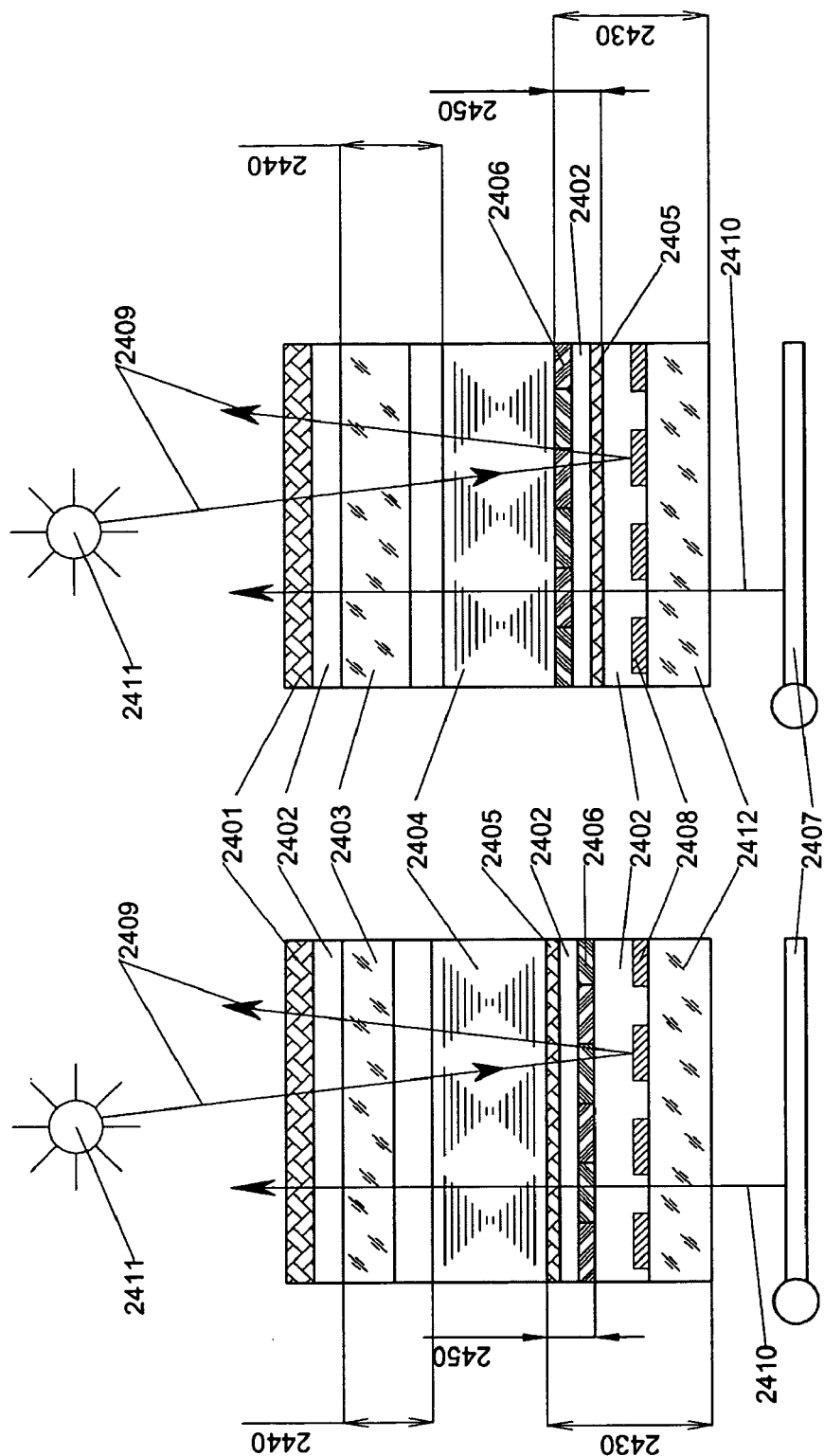
FIG. 24A schematically shows the reflective or transflective design, with the matrix of color filters and the optically anisotropic thin crystalline film (TCF) polarizer placed on the rear panel.

FIG. 24A schematically shows the reflective or transflective design, with the matrix of color filters 2406 and the optically anisotropic thin crystalline film (TCF) polarizer 2405 are placed on the rear panel 2430. The optically anisotropic thin crystalline film (TCF) polarizer 2405 polarizer is internal. The left panel of FIG. 24A schematically shows the polarizer 2405 is placed between the color filer matrix 2406 and the liquid crystal 2404, and the right panel of FIG. 24A schematically shows the polarizer 2405 is placed between the color filer matrix 2406 and the non-transparent or semi-transparent reflective layer 2408. Presence of other layers between the color filter matrix 2406 and the polarizer 2405 is optional for both left and right panels as shown by the numeral 2402. The front polarizer 2401 is optionally the conventional polarizer from the prior art, or the optically anisotropic thin crystalline film polarizer.

Figure 24B:
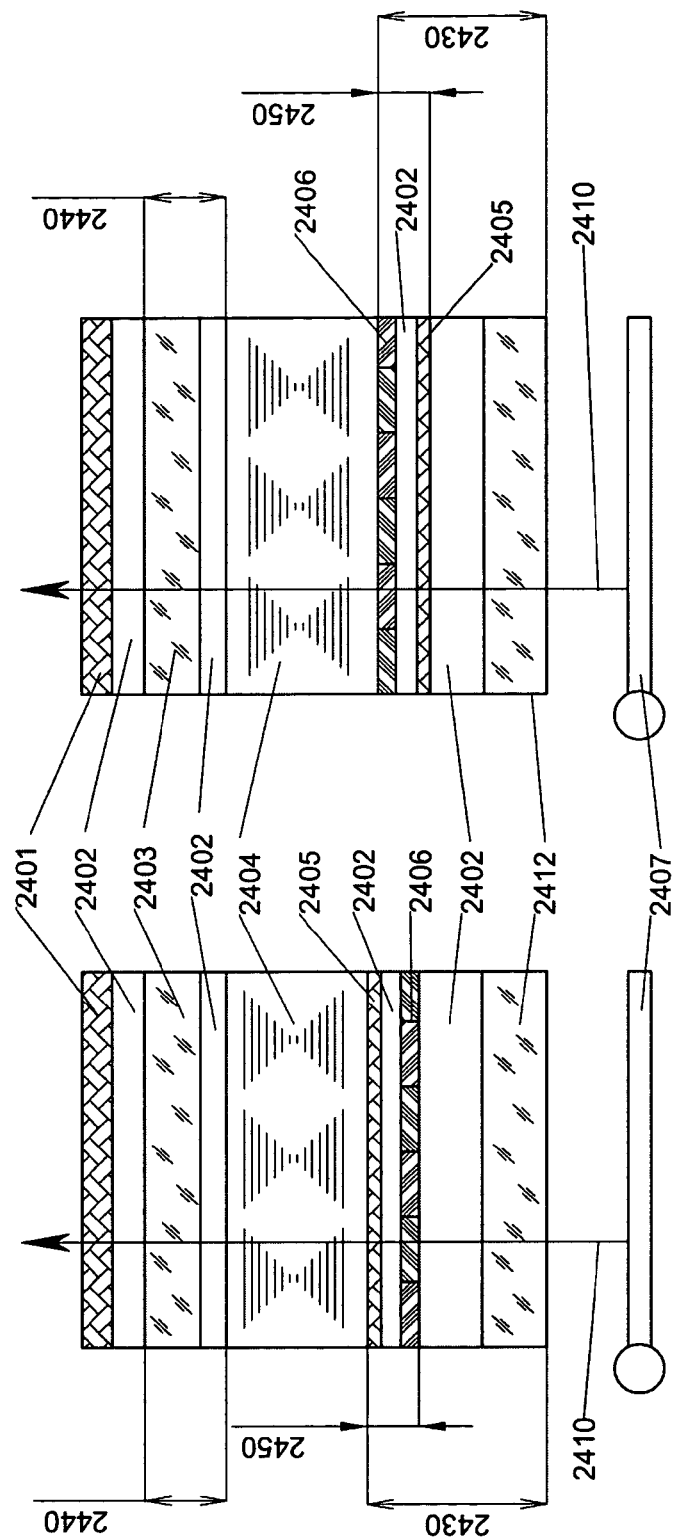
FIG. 24B schematically shows the transmissive design with the matrix of color filters and the optically anisotropic thin crystalline film (TCF) polarizer placed on the rear panel.

FIG. 24B schematically shows the transmissive design, with the matrix of color filters 2406 and the optically anisotropic thin crystalline film (TCF) polarizer 2405 placed on the rear panel 2430. The optically anisotropic thin crystalline film (TCF) polarizer 2405 is internal. The left panel of FIG. 24B schematically shows the polarizer 2405 placed between the color filer matrix 2406 and the liquid crystal 2404, and the right panel of FIG. 24B schematically shows the polarizer 2405 is placed between the color filer matrix 2406 and the backlight unit 2407.

Figure 24C:
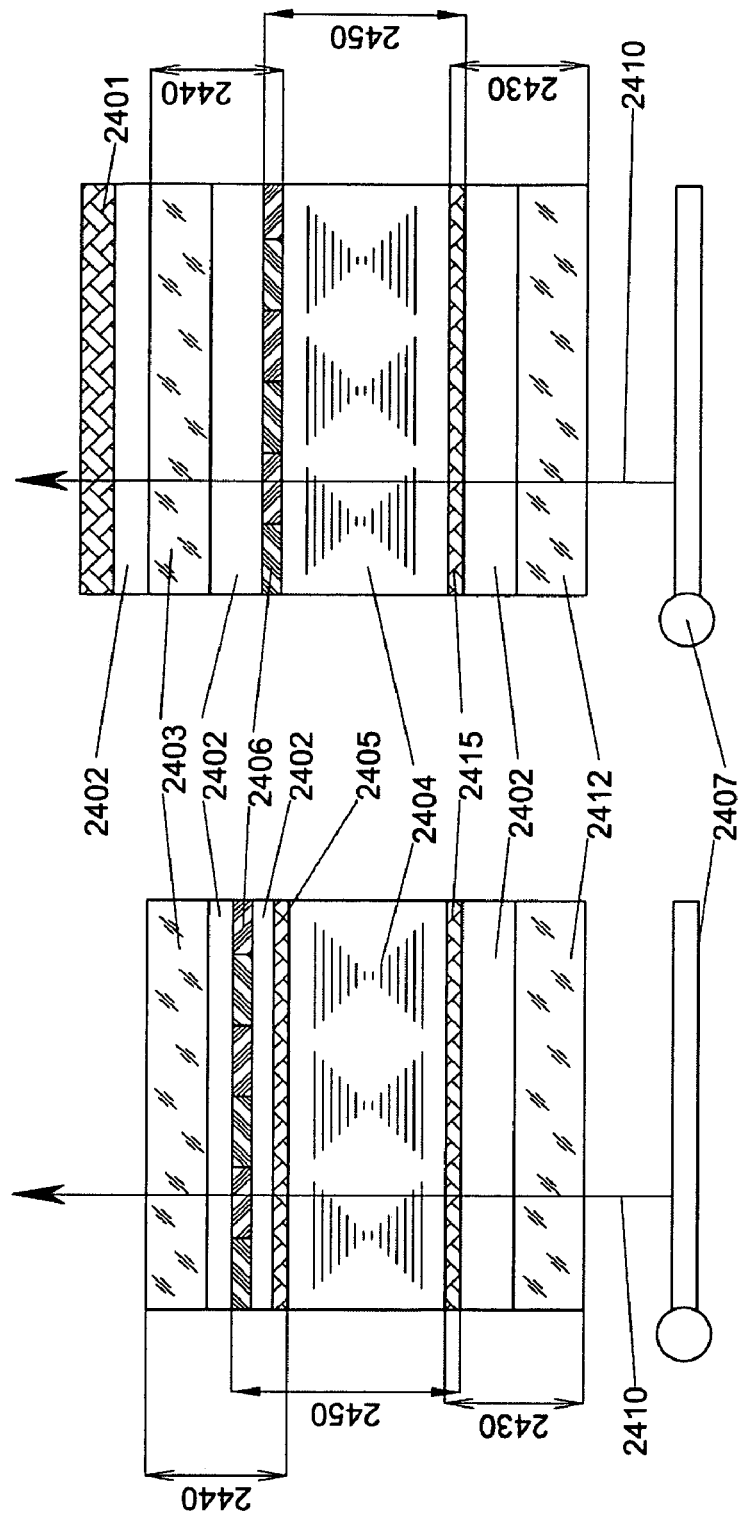
FIG. 24C schematically shows the transmissive design with the matrix of color filters placed on the front panel.

FIG. 24C schematically shows the transmissive design, with the matrix of color filters 2406 placed on the front panel 2440. The optically anisotropic thin crystalline film (TCF) polarizer 2405 polarizer is internal on the left panel of FIG. 24C, and is external on the right panel of FIG. 24C.

Figure 24D:
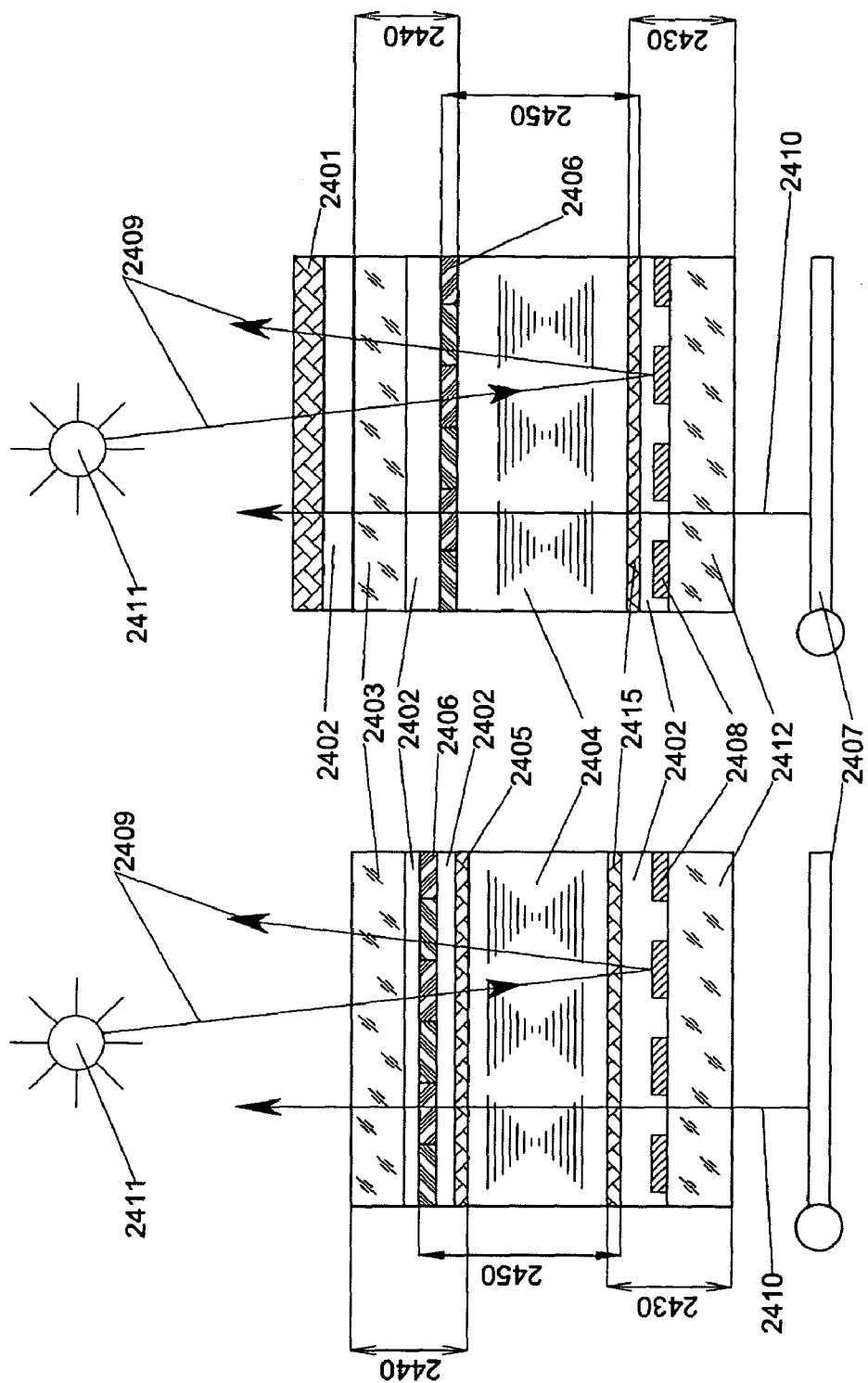
FIG. 24D schematically shows the reflective or transflective design, with the matrix of color filters placed on the front panel.

FIG. 24D schematically shows the reflective or transflective design, with the matrix of color filters 2406 placed on the front panel 2440. The optically anisotropic thin crystalline film (TCF) polarizer 2405 polarizer is internal on the left panel of FIG. 24D, and is external on the right panel of FIG. 24D. The rear panel 2440 is schematically shown with at least the rear internal polarizer layer 2415 in FIGS. 24C and 24D.

The director distribution of liquid crystal of the display in the off-state is determined by the alignment layers when the display is fabricated. In the on-state, the director of the liquid crystal has a tendency to be aligned along the electric field created by the electrodes over all the liquid crystal layer thickness except the boundary sub-layers, where the director remains twisted due to anchoring with the alignment surfaces. For typical values of the azimuthal anchoring strength ($\sim 0.2$ mJ/m$^2$) these twisted sub-layers remain even at very high applied electric field ($\sim 30$ V/μm) and can influence the optical performance of the display.

Figure 22:
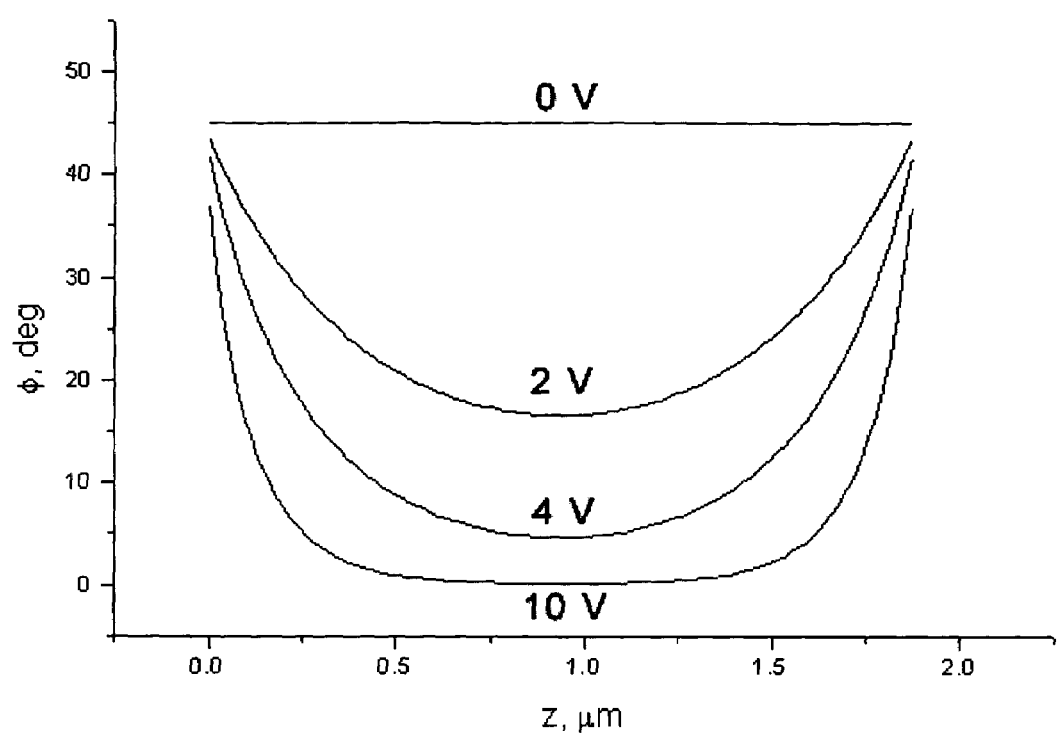
FIG. 22 shows the azimuthal distribution of the liquid crystal director under different values of in-plane voltage.

FIG. 22 shows the azimuthal liquid crystal director distribution (angle between the x-axis and the director projection onto xy plane) across the liquid crystal cell at different values of the voltage applied to in-plane electrodes. FIG. 22 shows that even if 10V is applied to the in-plane electrodes there are two boundary sub-layers, where the director deviates from the electric field (the field is along x-axis, i.e. its direction corresponds to zero azimuth angle). These sub-layers result in ellipticity of polarization of the light passed through the liquid crystal layer which in turn decreases the contrast ratio even at normal light incidence.

Thus, it is desirable to use the thin crystalline film of the invention to optically compensate the twisted sub-layers. The use of the thin crystalline film of the present invention as a compensation layer can significantly improve the contract ratio for normal reviewing and decrease the operation voltage.

One of the advantages of the present liquid crystal display is the use of an internal polarizer behind the liquid crystal. This can increase the contrast ratio of the display and provide unique opportunities to use the design in both reflective and transflective displays. Further, when such a configuration is used with a matrix of color filters to create a color liquid crystan display, an increase in the viewing angles at which the image on the display still appears without color distortions can be realized. The liquid crystal display of the invention also simplifies the fabrication process, increases the brightness of the produced images, and simplifies the application in displays of transflective type.

EXAMPLE 1

A simulation of the transflective STN LCD characteristics was performed. A full 4×4 propagation matrix computational approach is used in the simulation following Berreman's calculation techniques. Two cases were considered: The first case was for reflective mode operation, using a rear internal polarizer. The Thin Crystal Film (TCF) polarizer made from Optiva proprietary material was used for the internal polarizer. The second case was transmissive mode operation, considering a backlight that passes through a third ("C") polarizer to produce higher contrast. This third polarizer was modeled as an additional TCF layer. The TCF polarizers are commercially available from Optiva Inc., South San Francisco, Calif.

The simulated structure was as shown in FIG. 6D. The structure comprised a front high-efficiency traditional polarizer EG1224DU 601, a 570 nm retardation film 602, front and rear substrates 603 made of glass, a pair of transparent electrodes (ITO) 604, acryl protective layers 607, an internal rear TCF polarizer 606, an isolation layer 115, a semi-transparent reflective layer 608, and a supplementary external rear TCF polarizer 610 used for transmissive mode for higher contrast ratio. Numeral 611 and backlight unit 617 represent light path in the transmissive mode. Numeral 612 and ambient light source 616 represent light path in the reflective mode. Numeral 613 represents the liquid crystal layer. An antireflective coating was deposited on the front side of the front polarizer. Table 1 summarizes the parameters of the materials.

TABLE 1

Basic characteristics of the materials

| Materials | Type | Thickness | Ref. indices |
|---|---|---|---|
| ITO | 20 Ohm | 130 nm | 1.85 @ 633 nm |
| Acrylic | | 2000 nm | 1.54 |
| PI | | 40 nm | 1.52 |
| LC | ZLI-5100-000; 4 deg. pre-tilt; 7.1 micron cell gap; ¹⁄₄₈ duty cycle, 1.8 V-2.08 V | | |
| Glass | | 0.7 mm | 1.51 |
| Traditional polarizer | EG1224-DU, AR layer | 200 um | 1.52 |
| TCF | N015.00 | 300 nm Internal 400 nm External | |

Figure 7:
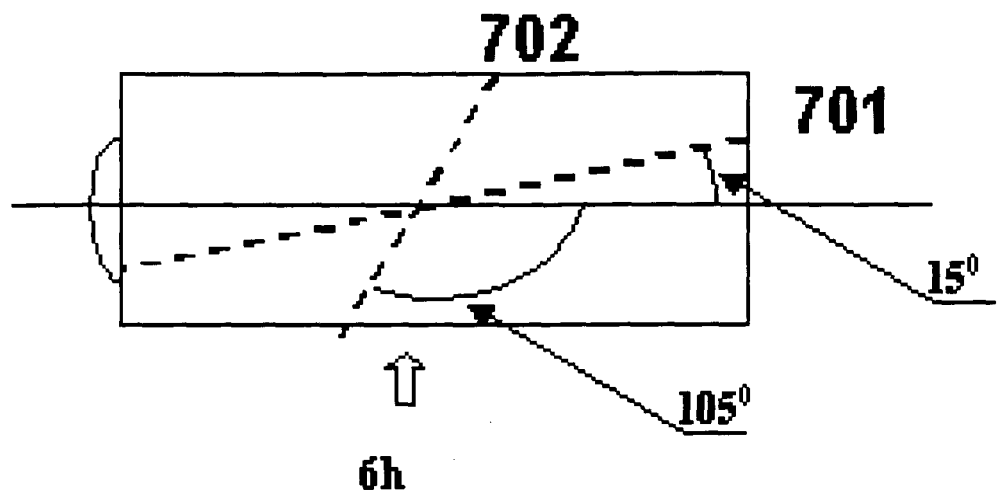
FIG. 7 is a schematic showing the polarizer axes in the liquid crystal display in accordance with one embodiment of the present invention.
Figure 8:
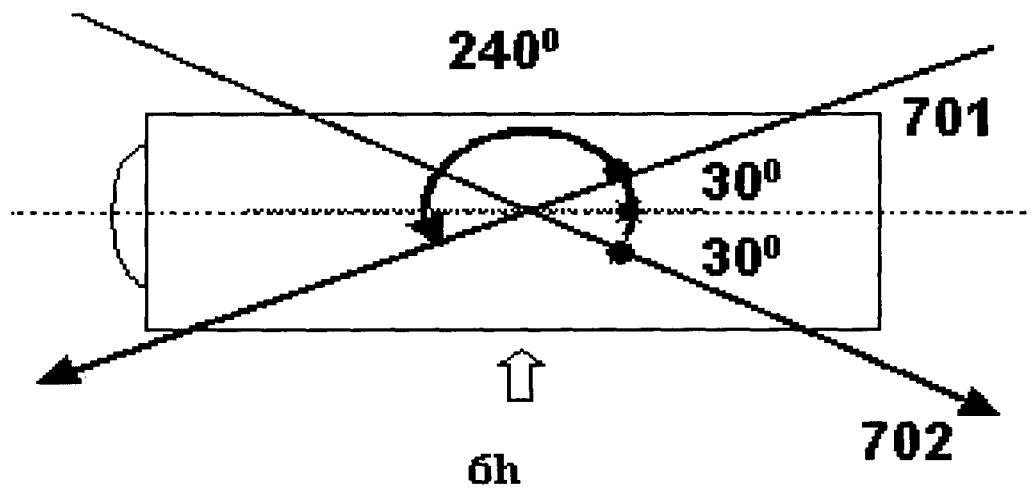
FIG. 8 is a schematic showing the rubbing directions and twist angle of the liquid crystal in accordance with one embodiment of the present invention.

The transmission axes of the polarizers in the liquid crystal display are shown in FIG. 7 with dotted lines. Numeral 701 represents the transmission axis of the front polarizer. Numeral 702 represents the transmission axis of the rear internal polarizer and the additional rear external polarizer. The rubbing directions of the liquid crystal are shown in FIG. 8. Numeral 701 represents the rubbing direction on the front side of the liquid crystal, and 702 represents the rubbing direction on the rear side of the liquid crystal. The twist angle of the liquid crystal is 240°. Table 2 summarizes the simulation results for both transmissive and reflective modes.

TABLE 2

Simulation Results

| Mode | Contrast ratio at normal incidence | Reflectance/ Transmittance on axis | Chromaticity |
|---|---|---|---|
| Reflective | 14.1 | 29.4% | D65 |
| Transmissive | 24.5 | 30.9% | D65 |

Figure 9:
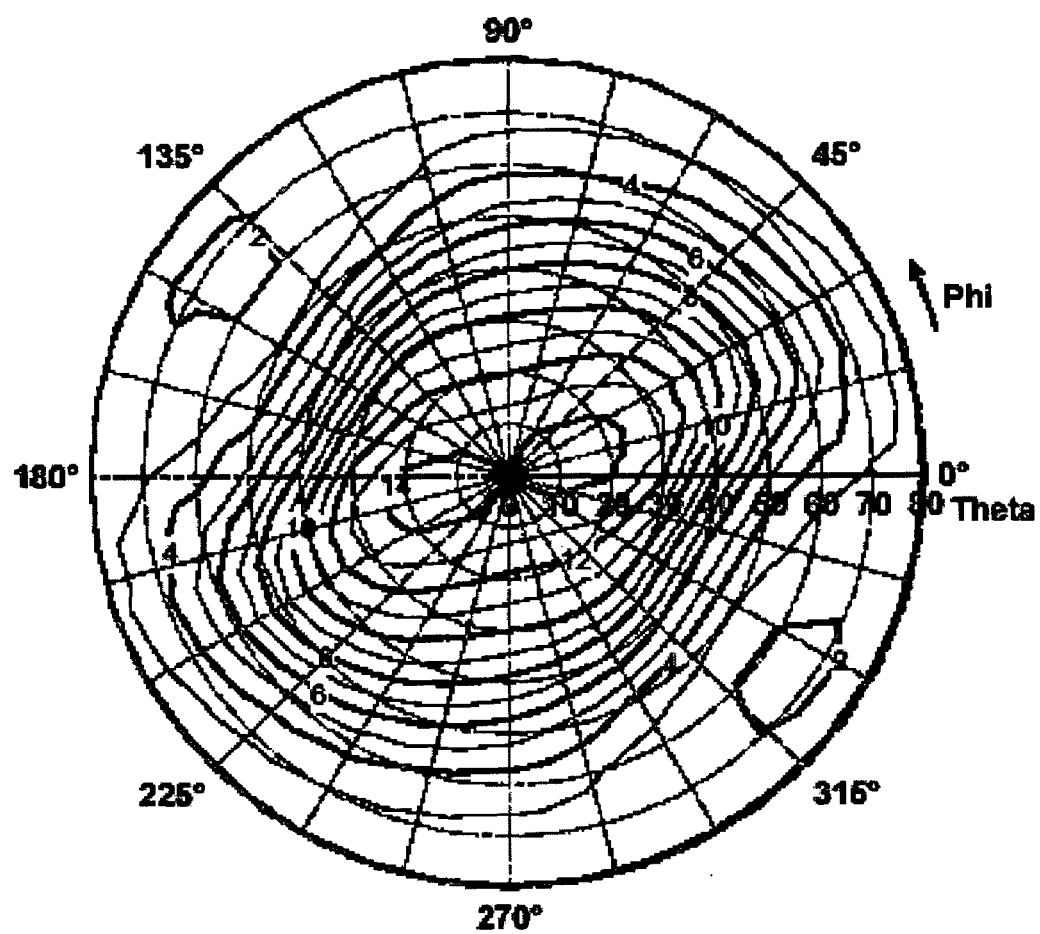
FIG. 9 is a contrast plot for the liquid crystal display of reflective mode in accordance with one embodiment of the present invention.
Figure 10:
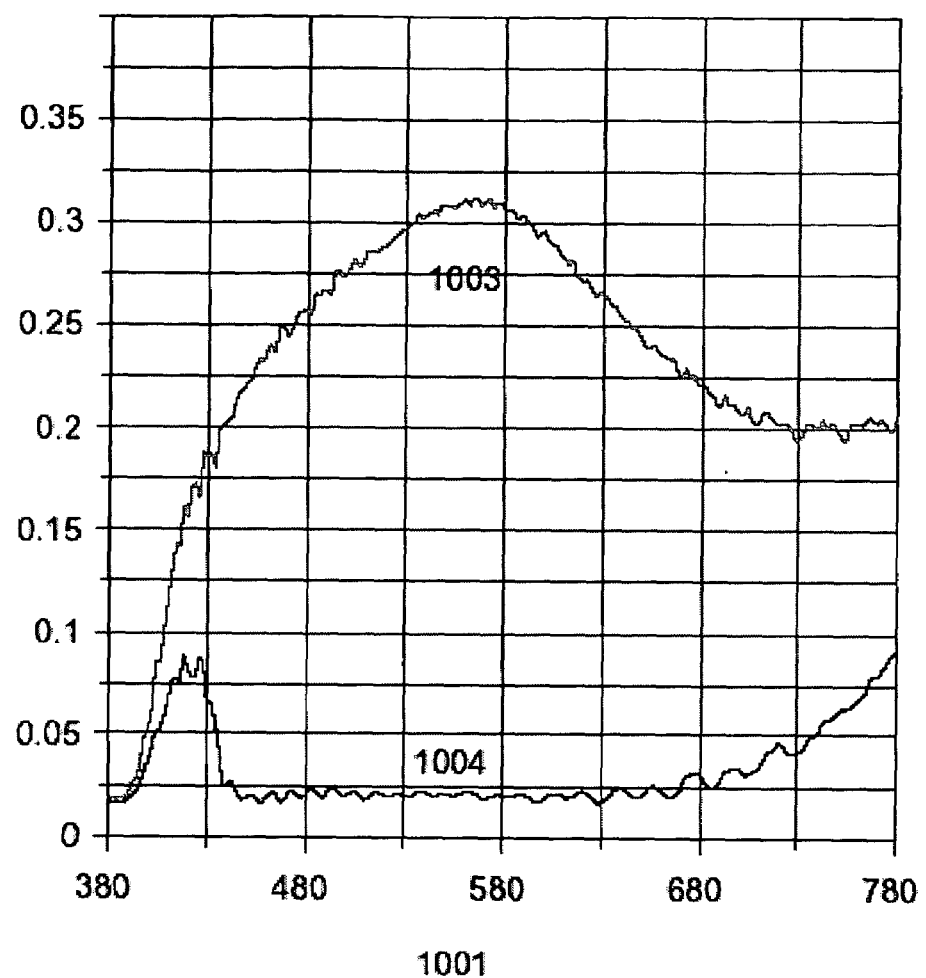
FIG. 10 is a reflectance spectrum for the liquid crystal display of reflective mode in on and off states in accordance with one embodiment of the present invention.
Figure 11:
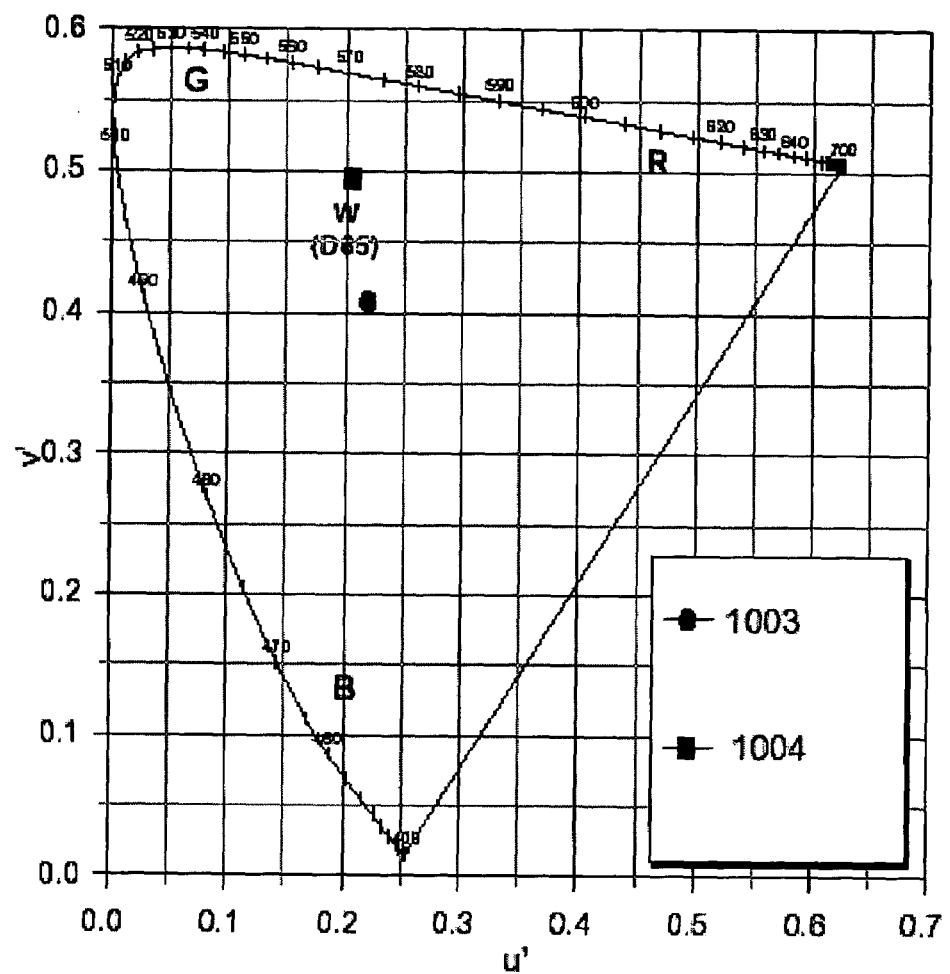
FIG. 11 is a chromaticity diagram for the liquid crystal display of reflective mode in on and off states in accordance with one embodiment of the present invention.

The particular results obtained for the reflective mode are also shown in FIGS. 9-11. FIG. 9 is a polar plot of the iso-contrast ratio.

Figure 12:
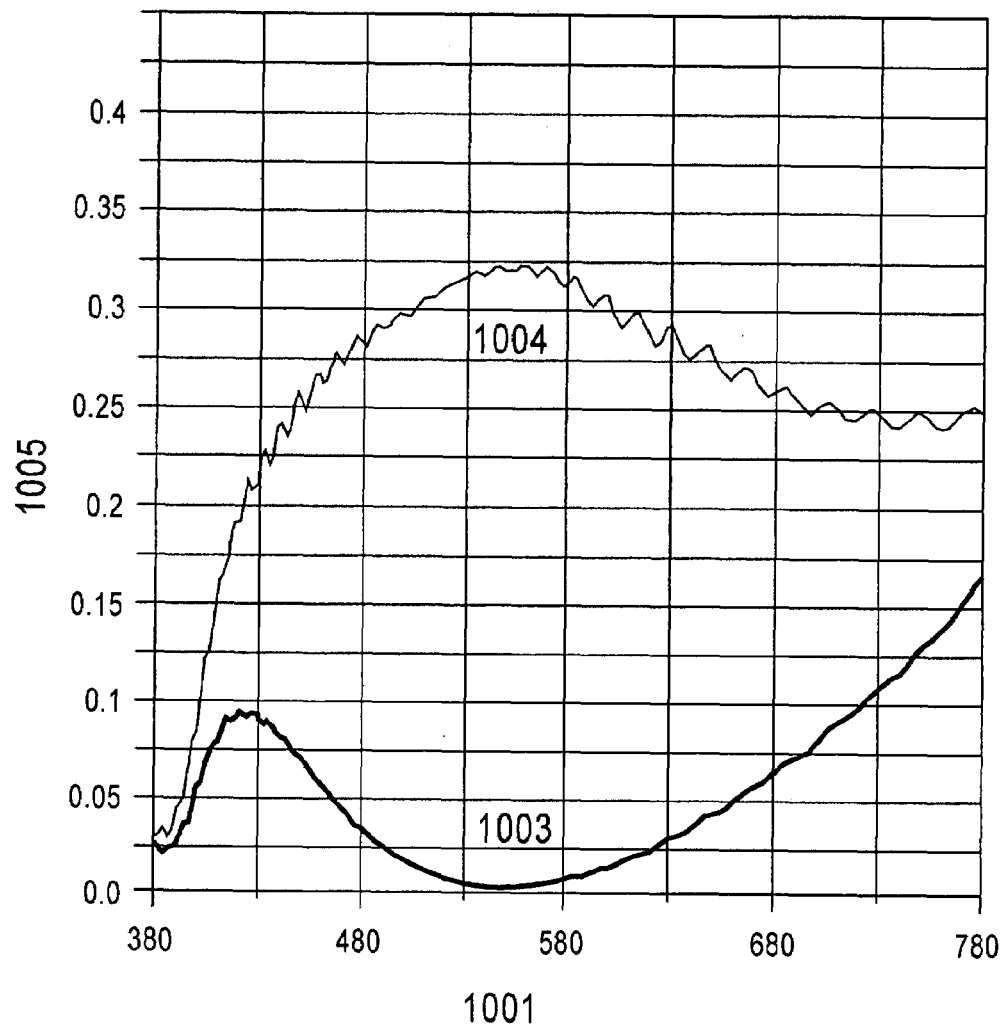
FIG. 12 is a transmission spectrum for the liquid crystal display of transmissive mode in on and off states in accordance with one embodiment of the present invention.
Figure 13:
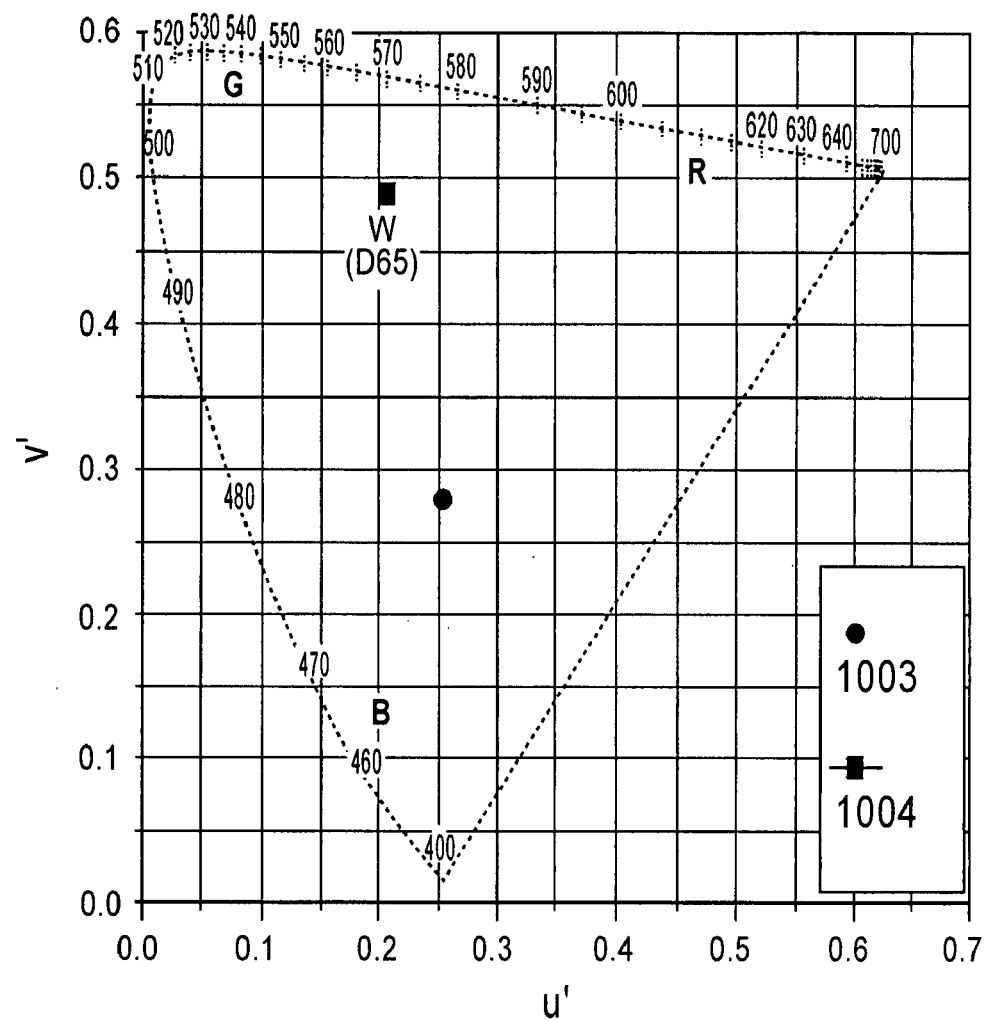
FIG. 13 is a chromaticity diagram for the liquid crystal display of transmissive mode in on and off states in accordance with one embodiment of the present invention.

FIG. 10 is a reflectance spectrum of the display. FIG. 11 is a chromaticity diagram. The particular results obtained for the transmissive mode are also shown in FIGS. 12-13. FIG. 12 is a transmission spectrum of the display. FIG. 13 is a chromaticity diagram. In FIGS. 10 to 13, numeral 1001 represents the wavelength axis, 1002 represents the reflectance axis, 1003 represents the voltage-off state of the display, 1004 represents the voltage-on state of the display and 1005 represents the transmission axis.

Both modes reveal very good characteristics in angular dependence of the contrast ratio, luminous throughput efficiency, and achromatic properties, thus showing the usefulness of the present invention.

EXAMPLE 2

A simulation of the transflective STN LCD was performed using the design as in Example 1 and the materials shown in Table 3:

TABLE 3

Materials used in the simulation.

| Materials | Type | Thickness | Ref. indices |
|---|---|---|---|
| ITO | 20 ohm | 130 nm | 1.85 @ 633 nm |
| PI | Nissan SE 3510 Roll rotation - 1000 rpm; Rubbing speed 100 mm/s Rubbing gap - 0.7 mm; Roll torque - 0.1 Kg$_f$*cm | 40 nm | |
| LC | ZLI-5100-000; 4 deg. pre-tilt; 7.1 micron cell gap; ¹⁄₁₆₀ duty cycle, 1.7 V-1.84 V rms, d/p = 0.53 | | |
| Glass | | 0.7 mm | 1.51 |
| Reflector | Al | | |
| Retarder | 240 reverse twist (CCW) | | |
| O-type polarizer | Sanritzu HLC2-5618SY, no AR layer | | |
| TCF | N015.00 | 350 nm | St'01 |

Figure 14:
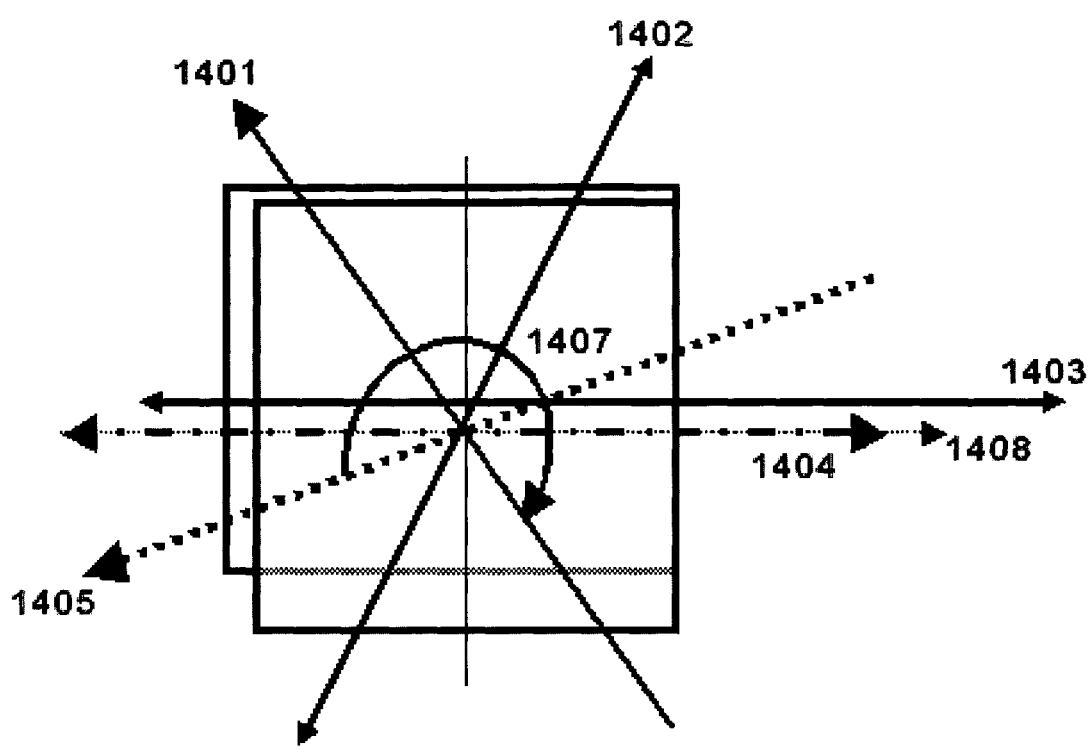
FIG. 14 is a schematic showing the polarizer axes, rubbing directions and twist angle of the liquid crystal in accordance with one embodiment of the present invention.

The rubbing directions of the front and rear alignment layers, the transmission axes of the internal rear polarizer and the front polarizer, and twist angle of the liquid crystal are shown in FIG. 14. In this design a conventional, high-efficiency Sanritzu HLC2-5618SY is used for both the front polarizer and the supplementary, rear external contrast-enhancing polarizer for the transmissive mode. This design is also especially noteworthy in that the transmission axis of the supplementary, rear external contrast-enhancing polarizer is rotated by 15° with respect to the transmission axis of the rear, internal TCF polarizer. In effect, this design utilizes the retardation of the internal TCF layer as a rear compensation film for the transmissive mode of operation and results in a substantial improvement in the light throughput and contrast ratio of the transmissive mode of operation.

Figure 15:
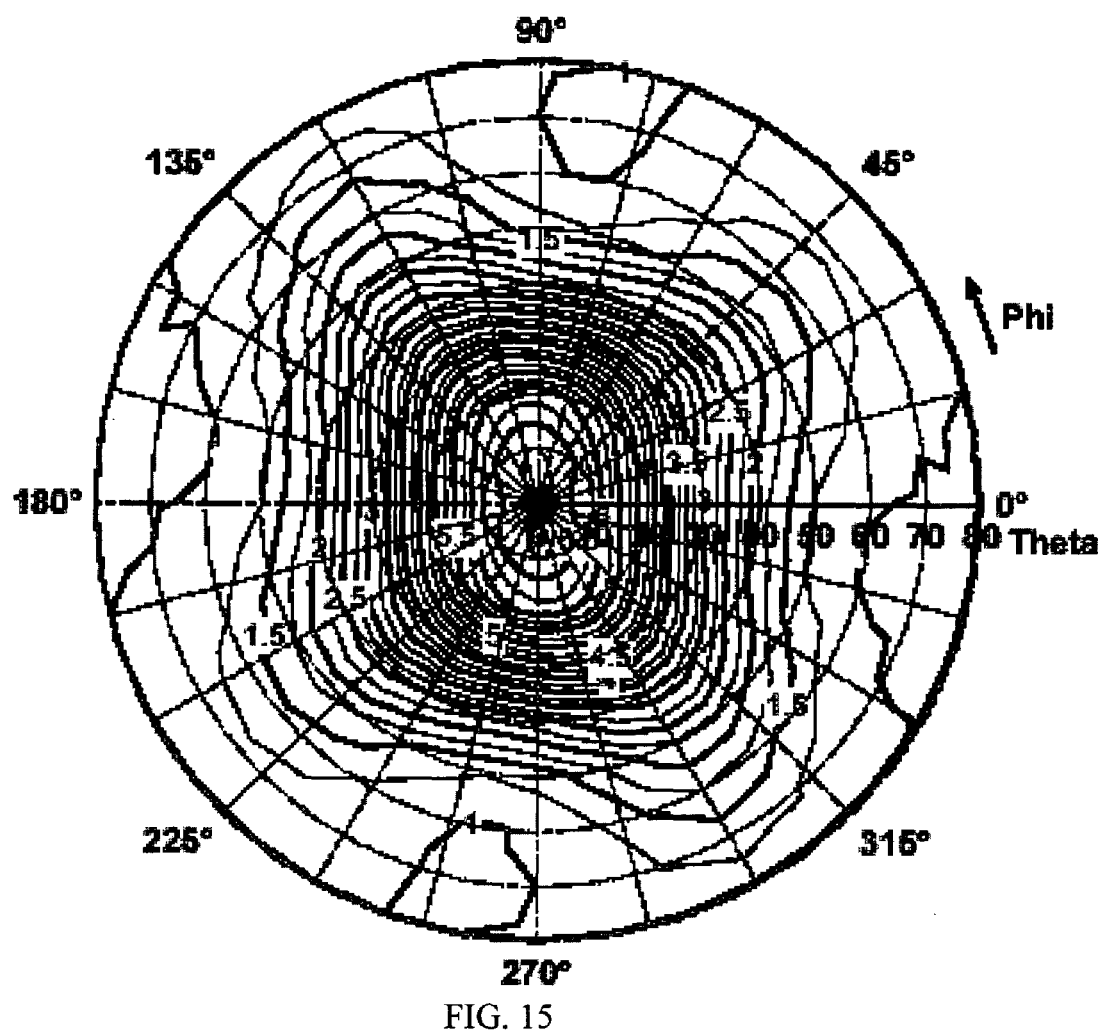
FIG. 15 is a contrast plot for the liquid crystal display of reflective mode in accordance with one embodiment of the present invention.
Figure 16:
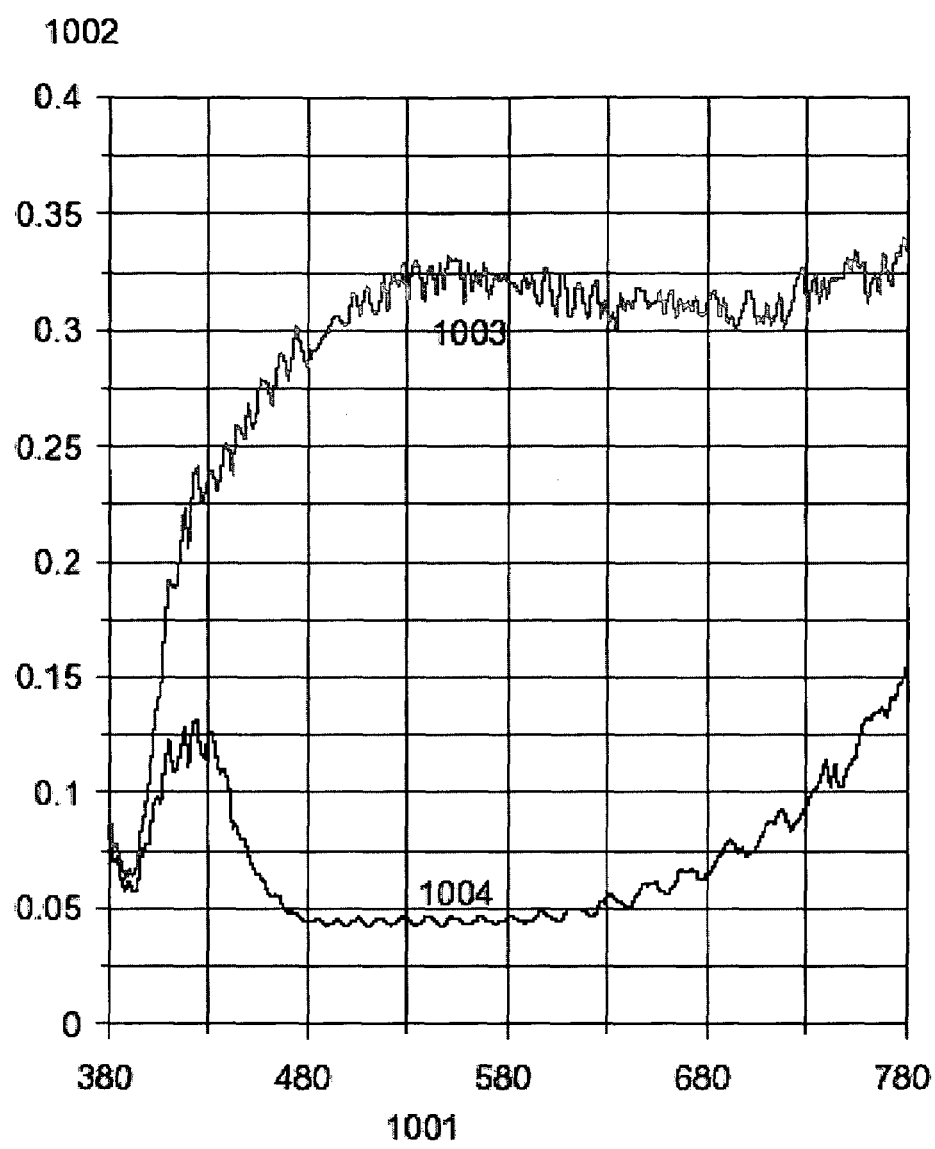
FIG. 16 is reflectance spectra for the liquid crystal display of reflective mode in off and on state in accordance with one embodiment of the present invention.
Figure 17:
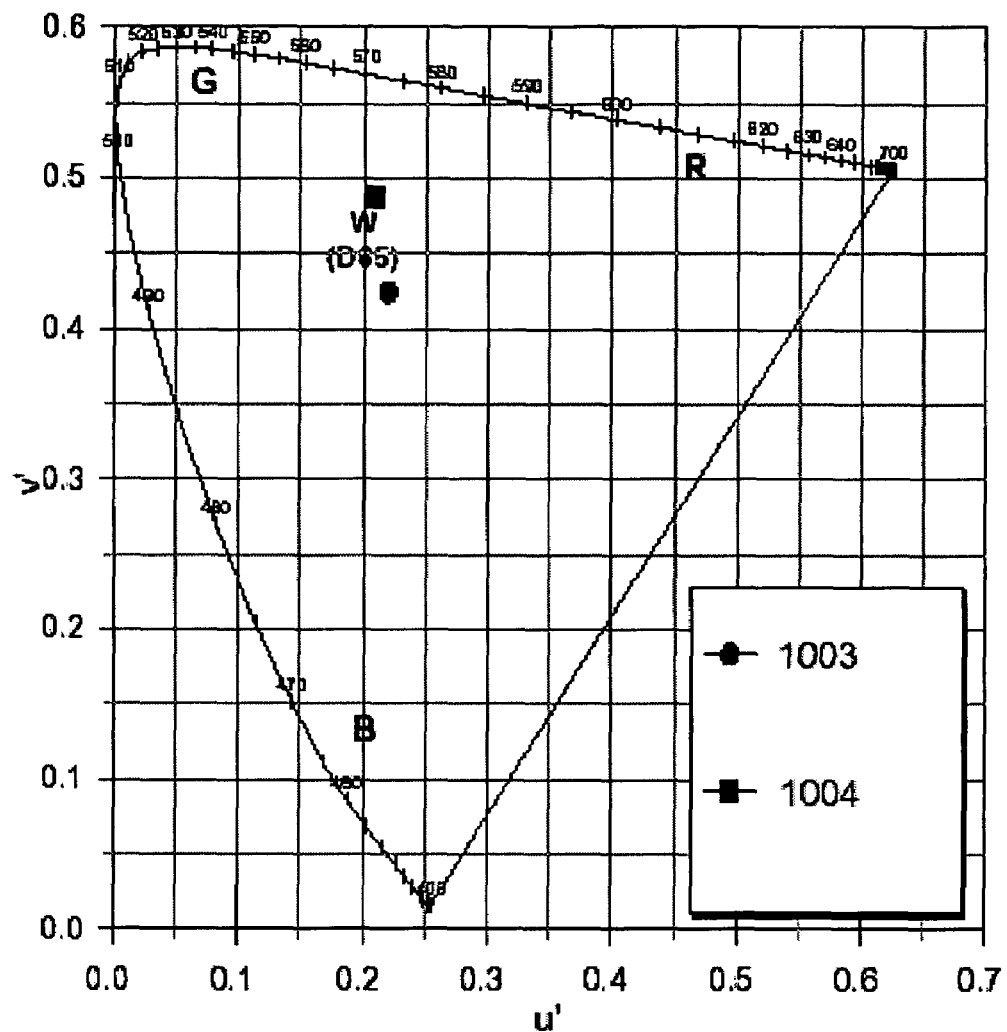
FIG. 17 is a chromaticity diagram for the liquid crystal display of reflective mode in on and off states in accordance with one embodiment of the present invention.
Figure 18:
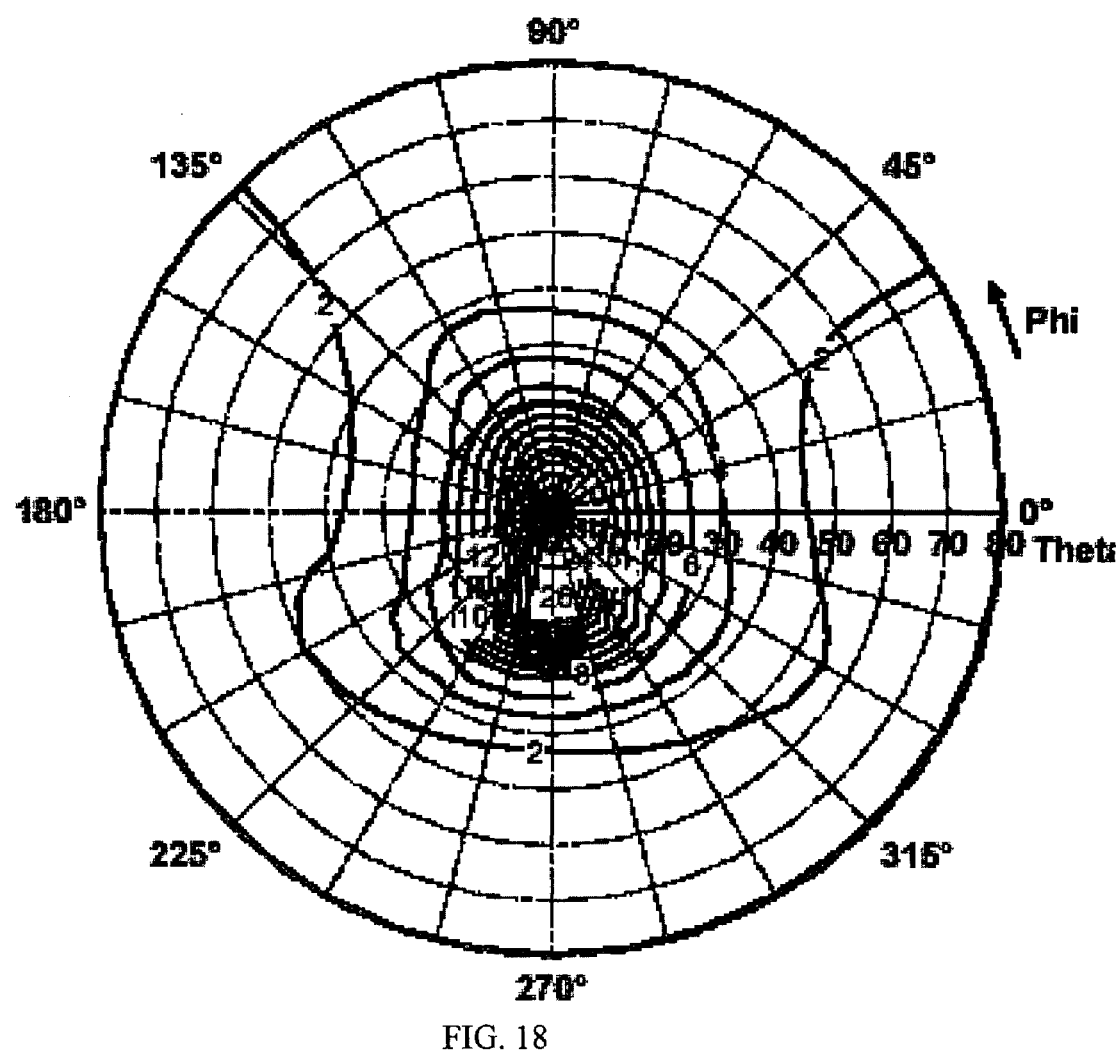
FIG. 18 is a contrast plot for the liquid crystal display of transmissive mode in accordance with one embodiment of the present invention.
Figure 19:
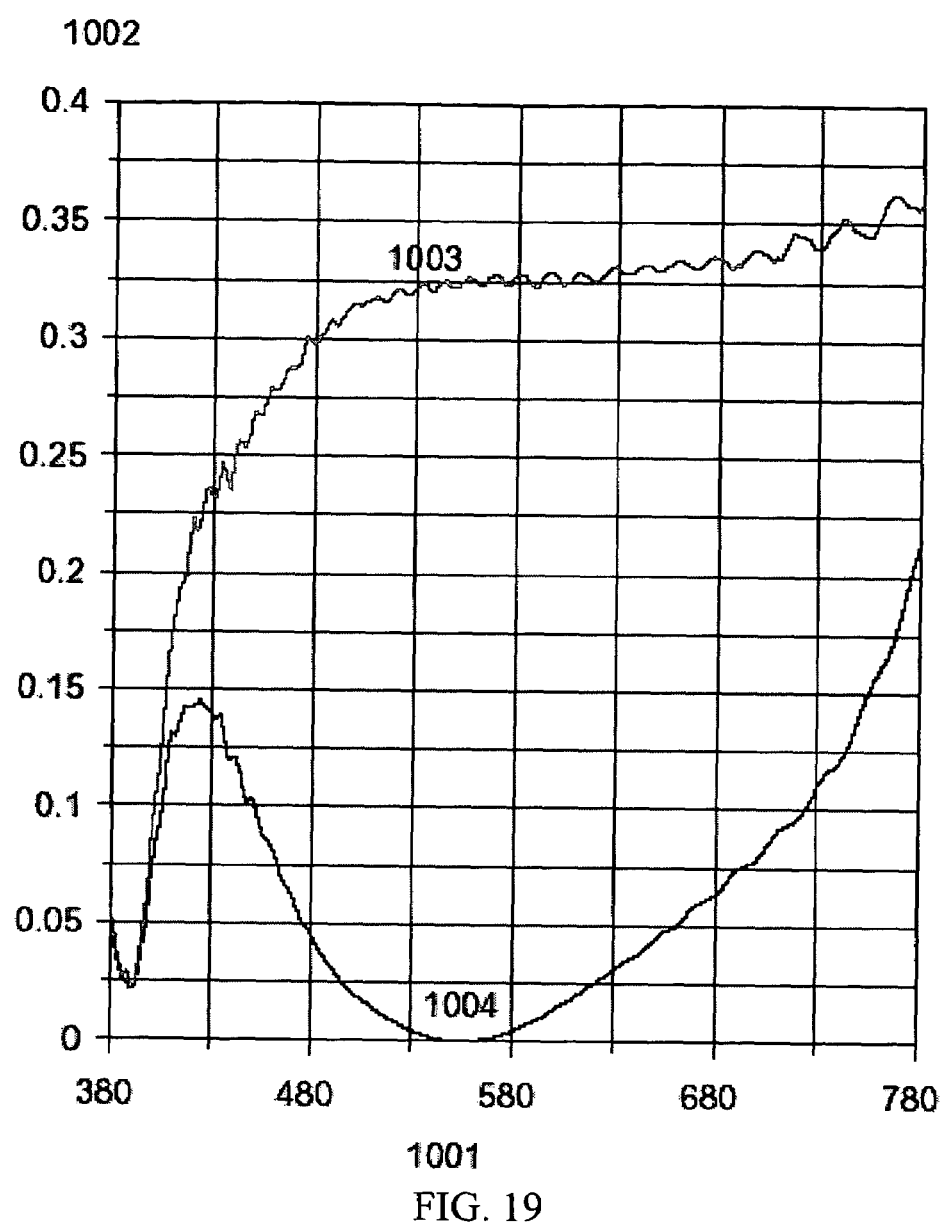
FIG. 19 is a transmission spectrum for the liquid crystal display of transmissive mode in on and off states in accordance with one embodiment of the present invention.
Figure 20:
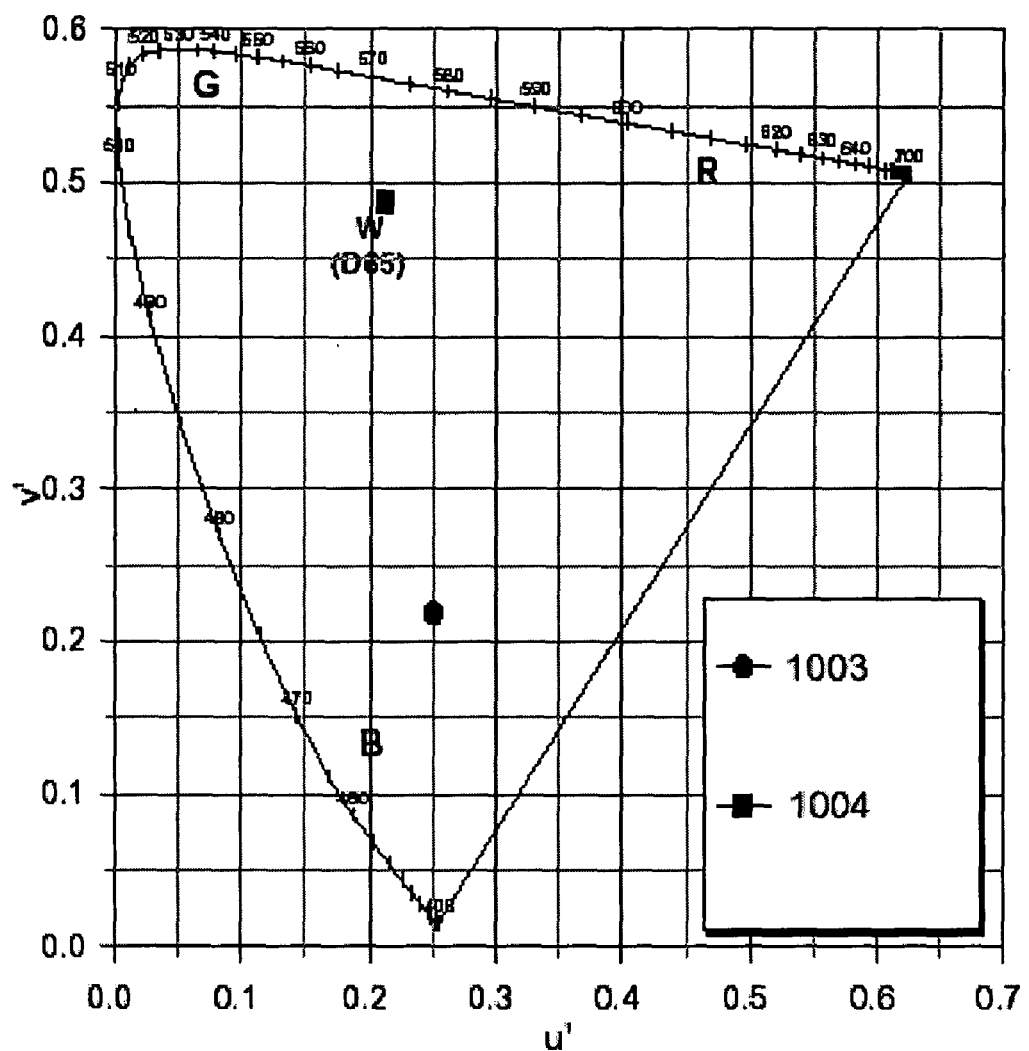
FIG. 20 is a chromaticity diagram of the liquid crystal display of transmissive mode in on and off states in accordance with one embodiment of the present invention.

The performance of the reflective mode is shown in FIGS. 15 through 17. The performance of the transmissive mode is shown in FIGS. 18 through 20. Table 4 summarizes the excellent characteristics of contract ratio, reflectance/transmittance on axis, and chromaticity for both reflective and transmissive modes. Note that the simulated performance in this case does not assume anti-reflective coating on the front surface of the display. If such a coating were incorporated the performance in reflective mode would be very substantially higher. In addition, it should also be noted that the performance simulations in this case are for a much higher display multiplexing rate (160 rows) and for the previous example (48 rows).

TABLE 4

Basic characteristics of the presented design.

| Mode | CR @ 10 deg. | Transmittance/ Reflectance | Color coordinates |
|---|---|---|---|
| Reflective | 6.9 | 31.8% | On: u' = 0.21, v' = 0.487 |
| | | | Off: u' = 0.221, v' = 0.425 |
| Transmissive | 27.5 | 32.25% | On: u' = 0.212, v' = 0.4882 |
| | | | Off: u' = 0.251, v' = 0.219 |

EXAMPLE 3

A simulation of in-plane switching and optical compensation using the thin crystalline film of the invention was performed. The initially planar LC director distribution at 45° with respect to the in-plane electric field was considered.

Figure 21:
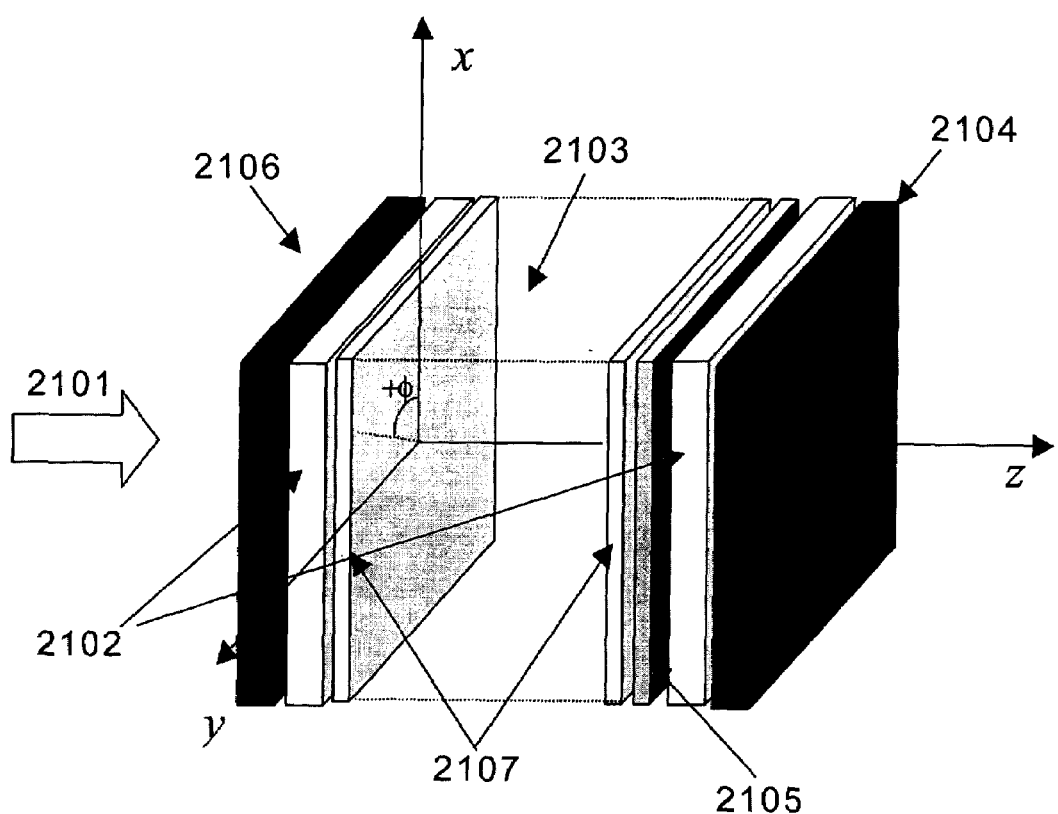
FIG. 21 is a schematic showing the structure of layers containing a compensation layer in accordance with one embodiment of the present invention.

FIG. 21 schematically shows the simulation design. In this design, the normally white mode of operation was considered, the two polarizers were crossed and the liquid crystal layer functioned as the birefringent plate producing the white appearance in the off-state.

The simulation design comprises the glass plates 2102, the liquid crystal layer 2103 having thickness of 1.9 microns, the aligning PI layers 2107, yellow TCF compensation film 2105. The front standard polarizer 2106 has the transmission axis angularly displaced with respect to y coordinate axis by an angle from 0° to 10°. The rear standard polarizer 2104 has the transmission axis angularly displaced with respect to y coordinate axis by an angle 90°. The wide empty arrow 2101 shows the direction from the viewer to the front side of the display.

The materials used in the simulation and their parameters were as follows:

Polarizers (2104, 2106) were O-type and characterized by the dichroic ratio of 30 and refractive index of 1.5 (the thickness was 0.2 mm and $k_0$=0.001 $\mu m^{-1}$). The polarizers were crossed ($\phi_1$, $\phi_2$)=(0°, 90°) and had the transmission axis at 45° with respect to the LC director in off-state.

Glass plates (2102) were 0.8 mm thick with the refractive index n=1.5.

Alignment PI layers (2107) were 40 nm thick (n=1.68).

Yellow TCF material available from Optiva, Inc. in South San Francisco, Calif. was used as a compensation layer (2105) (at λ=550 nm the Yellow TCF material is characterized by optical anisotropy Δn=0.3).

To make a normally white mode of operation the retardation of the LC layer (2103) was chosen to be close to one of half wave plate, so Δnd≅280 nm (for the case of MLC-6204-000 d=1.87 μm).

Figure 23A:
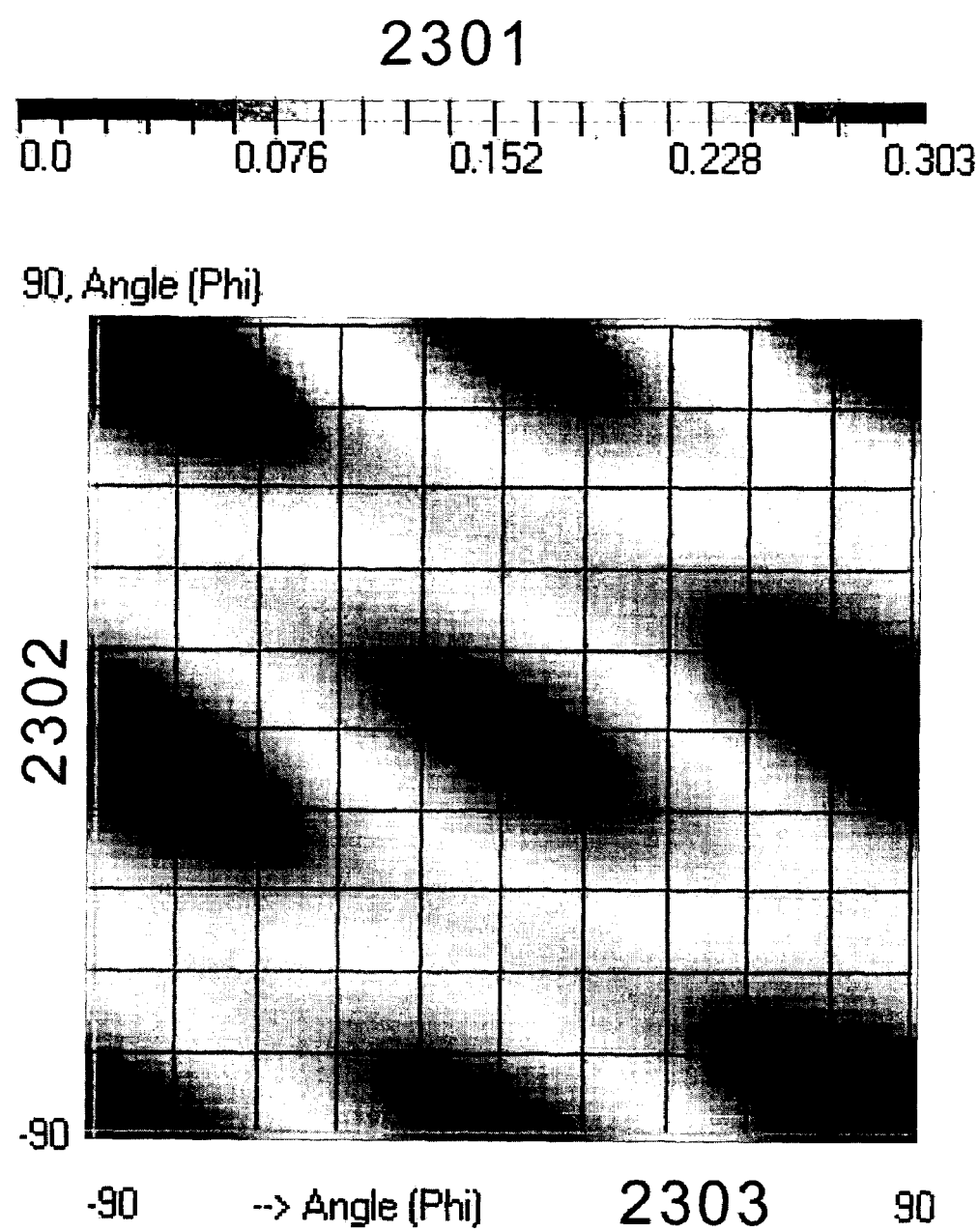
FIG. 23A is a parameter map showing transmission coefficient for the liquid crystal display comprising a thin crystal film compensation layer in accordance with one embodiment of the present invention.
Figure 23B:
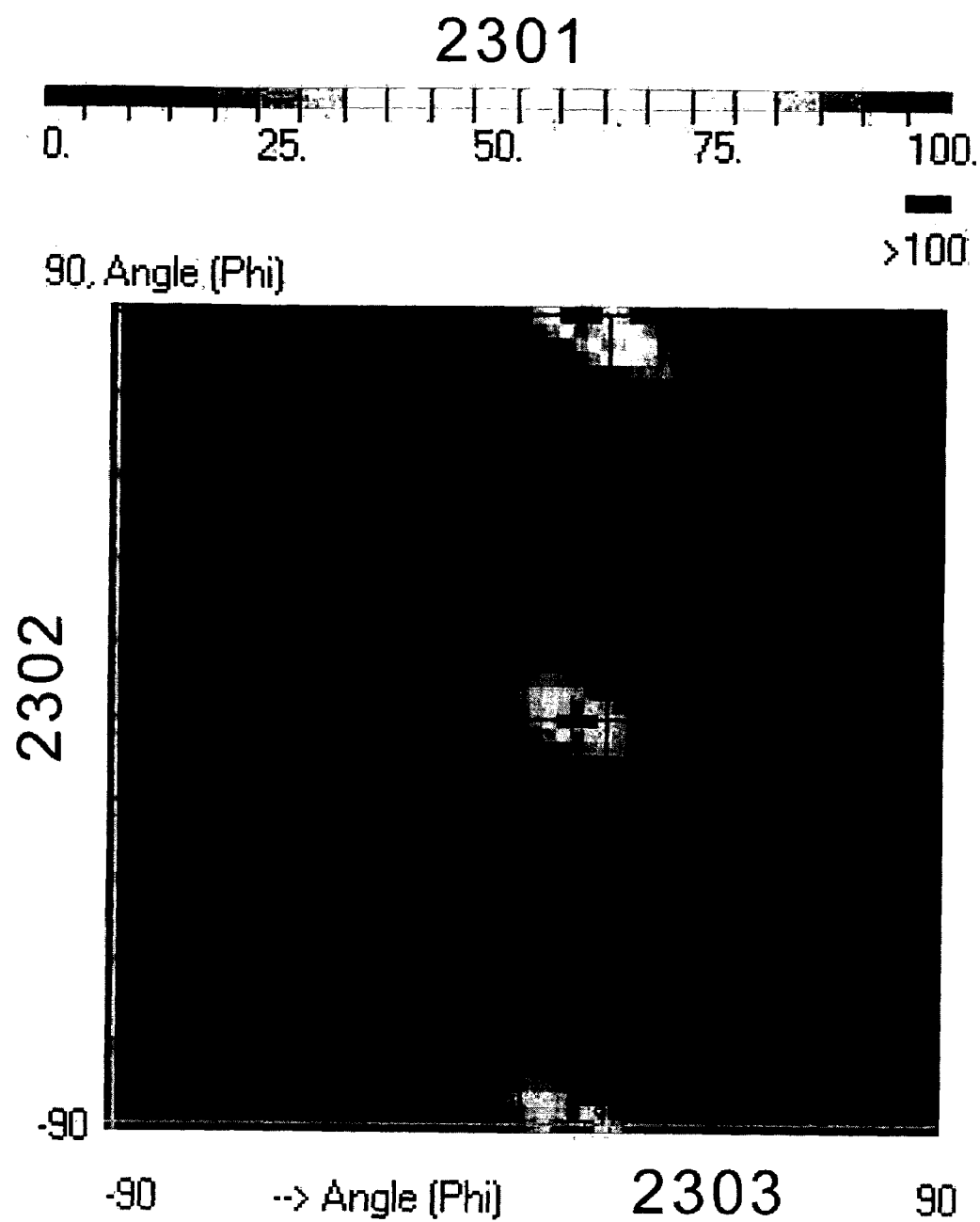
FIG. 23B is a parameter map showing contrast ratio for the liquid crystal display having a thin crystal film compensation layer in accordance with one embodiment of the present invention.

To optimize the optical compensation the parameter optimization maps were evaluated shown in FIGS. 23A and 23B. These maps show the dependence of the transmission coefficient (FIG. 23A) and contrast ratio (FIG. 23B) versus the orientations of the transmission axis of the first polarizer (2106 the polarizer which is closer to the light source) and slow axis of the TCF retarder (2105) of thickness of 0.5 μm. The thickness of TCF was fixed to simplify the technological process.

The scale 2301 shows the correspondence between the gray levels and the values of the transmission coefficient (FIG. 23A) or contrast ratio (FIG. 23B). In both FIGS. 23A and 23B the orientation angle of the transmission axis of the first polarizer is shown on the axis 2303, and the orientation of the slow axis of the TCF retarder is shown on the axis 2302. FIGS. 23A and 23B show that the maximum contrast ratio and brightness can be achieved if the front polarizer deviates from the crossed state so that the angle φ of the transmission axis is of about 10°, while the slow axis of the TCF retarder is at φ=0°, i.e. coincides with the applied field. The optical compensation results in significant increase of the contrast ratio at normal light incidence.

In the compensation design of the liquid crystal display the use of a TCF retarder results in improvement of contrast ratio. The use of a TCF retarder for this purpose is preferable when the contrast of the liquid crystal display is the priority characteristics. This design may lead to some drop in viewing characteristics which will depend on the liquid crystal display design and on the TCF retarder used.

As described above, a color liquid crystal display has been described. The foregoing descriptions of specific embodiments of the invention have been presented for the purpose of illustration and description. They are not intended to be exhaustive or to limit the invention to the precise forms disclosed, and obviously many modifications, embodiments, and variations are possible in light of the above teaching. It is intended that the scope of the invention be defined by the claims appended hereto and their equivalents.

What is claimed is:

1. A liquid crystal display, comprising:
   a front panel including at least one polarizer and a substrate;
   a rear panel including at least one polarizer and a substrate;
   liquid crystal placed between the front and rear panels;
   a reflective layer; and
   a matrix of color filters,
   wherein the polarizer on the rear panel is internal, the reflective layer is disposed on internal side of the rear substrate and the combined thickness of all layers positioned between the matrix of color filters and the rear polarizer does not exceed 10 microns,
   wherein at least one internal polarizer is made of at least partially crystalline film formed by rodlike supramolecules, axes of said rodlike supramolecules are aligned along the transmission axis of the internal polarizer, and said rodlike supramolecules comprise at least one disc-shaped polycyclic organic compound with conjugated π-systems.

2. The liquid crystal display according to claim 1, where the polarizer on the rear panel is placed before the matrix of color filters.

3. The liquid crystal display according to claim 1, where the polarizer on the rear panel is placed between the matrix of color filters and the reflective layer.

4. The liquid crystal display according to claim 1, wherein a combined thickness of the matrix of color filters and layers between the matrix of color filters and the reflective layer is selected such that light rays incident on a surface of the display from within a wide angular cone of illumination and propagating through a color filter travel through the same color filter after being reflected from the reflective layer, thereby providing a reflective color display with a wide angular viewing volume free of angle-dependent color distortion.

5. The liquid crystal display according to claim 1, wherein the matrix of color filters is placed on the front panel of the display.

6. The liquid crystal display according to claim 1, wherein the matrix of color filters is placed on the rear panel of the display.

7. The liquid crystal display according to claim 1, wherein the polarizer on the front panel is internal.

8. The liquid crystal display according to claim 1, wherein the polarizer on the front panel is external.

9. The liquid crystal display according to claim 1, wherein the liquid crystal is twist-nematic.

10. The liquid crystal display according to claim 1, wherein the liquid crystal is super twist-nematic.

11. The liquid crystal display according to claim 1, wherein the liquid crystal utilizes a vertically-aligned mode.

12. The liquid crystal display according to claim 1, wherein the liquid crystal utilizes an in-plane switching mode.

13. The liquid crystal display according to claim 1, wherein the display is driven using passive-matrix addressing.

14. The liquid crystal display according to claim 1, wherein the display is driven using active-matrix addressing.

15. The liquid crystal display according to claim 1, wherein at least one of the polarizers represents an alignment layer or a retarder layer, or a color correcting filter, or any combination thereof.

16. The liquid crystal display according to claim 1, wherein at least one internal polarizer is an A-plate retarder.

17. The liquid crystal display according to claim 1, wherein the reflective layer is conductive and functions as an electrode.

18. The liquid crystal display according to claim 1, further comprising an anti-reflective coating applied onto a front surface of the front panel.

19. The liquid crystal display according to claim 1, further comprising an anti-glare coating applied onto a front surface of the front panel.

20. The liquid crystal display according to claim 1, further comprising at least one of the following functional layers: retarder, protective, scattering, and correcting color filters.

21. The liquid crystal display according to claim 1, wherein the reflective layer is a diffusive reflector.

22. The liquid crystal display according to claim 1, wherein the reflective layer is a specular reflector.

23. The liquid crystal display according to claim 1, wherein the reflective layer combines both specular and diffusive properties in such a way as to produce gained scattering.

24. The liquid crystal display according to claim 1, wherein the reflective layer is semi-transparent and the display further comprise a backlighting system.

25. The liquid crystal display according to claim 1, wherein the color filter matrix is placed between the two polarizers, and both polarizers and the color filter matrix are placed in the same panel.

26. The liquid crystal display according to claim 1, wherein the reflective layer is a holographic reflector.

27. The liquid crystal display according to claim 1, wherein at least one said internal polarizer has an interplanar distance of 3.4±0.3 Å along the transmission axis.

28. The liquid crystal display according to claim 1, wherein at least one said disc-shaped polycyclic organic compound contains heterocycles.

29. The liquid crystal display according to claim 1, wherein the internal polarizer is formed from a lyotropic liquid crystal.

* * * * *